US011270273B2

(12) United States Patent
Chen et al.

(10) Patent No.: US 11,270,273 B2
(45) Date of Patent: Mar. 8, 2022

(54) RESOURCES DISPENSING DEVICE AND RESOURCES DISPENSING METHOD

(71) Applicant: TENCENT TECHNOLOGY (SHENZHEN) COMPANY LIMITED, Shenzhen (CN)

(72) Inventors: Yaoguang Chen, Shenzhen (CN); Zongyang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 751 days.

(21) Appl. No.: 15/668,893

(22) Filed: Aug. 4, 2017

(65) Prior Publication Data

US 2018/0032974 A1 Feb. 1, 2018

Related U.S. Application Data

(63) Continuation of application No. PCT/CN2016/079560, filed on Apr. 18, 2016.

(30) Foreign Application Priority Data

Apr. 24, 2015 (CN) .......................... 201510201454.X

(51) Int. Cl.
*G06Q 20/36* (2012.01)
*G06Q 20/06* (2012.01)
(Continued)

(52) U.S. Cl.
CPC .......... *G06Q 20/065* (2013.01); *G06F 16/00* (2019.01); *G06Q 20/0457* (2013.01);
(Continued)

(58) Field of Classification Search
CPC ............... G06Q 30/0641; G06Q 30/06; G06Q 30/0633; G06Q 30/0623; G06Q 30/02;
(Continued)

(56) References Cited

U.S. PATENT DOCUMENTS

2010/0082760 A1* 4/2010 Martino ................. H04L 51/22
709/206
2010/0287027 A1 11/2010 Jacobs et al.
(Continued)

FOREIGN PATENT DOCUMENTS

CN 1897528 A 1/2007
CN 101944219 A 1/2011
(Continued)

OTHER PUBLICATIONS

Ron White, How Computers Work, 15 Oct. 15, 2003, Que Publishing, 7th Ed, p. 4 (Year: 2003).*
(Continued)

*Primary Examiner* — Patrick McAtee
*Assistant Examiner* — Nakia Leffall-Allen
(74) *Attorney, Agent, or Firm* — Anova Law Group, PLLC

(57) ABSTRACT

The present disclosure relates to the field of Internet. Disclosed are resources dispensing device and resources dispensing methods. The system including: a sender client, a server cluster and at least one receiver client; the sender client is to generate n virtual packages through interacting with the server cluster, each virtual package is to distribute part of resources to be dispensed to the receiver client, wherein n is an integer larger than 1; the sender client is further to provide a pick-up message of the n virtual packages to the receiver client; the receiver client is to display at least two virtual packages of the n virtual packages in a user interface according to the pick-up message of the n virtual packages; the receiver client is further to pick up a target virtual package from the at least two virtual packages through interacting with the server cluster according to a pick-up operation received.

6 Claims, 16 Drawing Sheets

(51) Int. Cl.
*G06Q 20/22* (2012.01)
*G06Q 20/10* (2012.01)
*G06Q 20/28* (2012.01)
*G06Q 20/04* (2012.01)
*G06F 16/00* (2019.01)
*G06Q 20/12* (2012.01)
*G06Q 20/32* (2012.01)
*G06Q 30/06* (2012.01)

(52) U.S. Cl.
CPC ......... *G06Q 20/102* (2013.01); *G06Q 20/123* (2013.01); *G06Q 20/28* (2013.01); *G06Q 20/29* (2013.01); *G06Q 20/3255* (2013.01); *G06Q 30/0641* (2013.01)

(58) Field of Classification Search
CPC ............... G06Q 30/0601; G06Q 20/12; G06Q 30/0639; G06Q 30/08; G06Q 20/322; G06Q 50/01; G06Q 10/087; G06Q 30/0613; G06Q 30/0643; G06Q 10/083; G06Q 20/123; G06Q 30/0267; G06Q 10/06; G06Q 30/0269; G06Q 30/0283; G06Q 30/0631; G06Q 30/0635; G06Q 10/02; G06Q 10/10; G06Q 20/401; G06Q 30/00; G06Q 30/0253; G06Q 30/0277; G06Q 30/0281; G06Q 30/0603; G06Q 30/0625; G06Q 40/04; G06Q 50/16; G06Q 10/00; G06Q 10/107; G06Q 10/20; G06Q 20/1235; G06Q 20/18; G06Q 20/3278; G06Q 20/3676; G06Q 20/40; G06Q 20/40145; G06Q 30/0201; G06Q 30/0202; G06Q 30/0222; G06Q 30/0252; G06Q 30/0261; G06Q 30/04; G06Q 50/06; G06Q 50/12; G06Q 50/163; G06Q 50/167; G06Q 10/06313; G06Q 10/08; G06Q 10/0833; G06Q 10/0838; G06Q 10/0875; G06Q 10/101; G06Q 10/30; G06Q 20/085; G06Q 20/0855; G06Q 20/14; G06Q 20/145; G06Q 20/204; G06Q 20/208; G06Q 20/32; G06Q 20/3224; G06Q 20/325; G06Q 20/327; G06Q 20/3274; G06Q 20/3276; G06Q 20/356; G06Q 20/36; G06Q 20/367; G06Q 20/382; G06Q 20/3825; G06Q 20/3829; G06Q 20/388; G06Q 20/4014; G06Q 20/4016; G06Q 20/409; G06Q 20/42; G06Q 30/012; G06Q 30/016; G06Q 30/0206; G06Q 30/0207; G06Q 30/0223; G06Q 30/0224; G06Q 30/0225; G06Q 30/0251; G06Q 30/0255; G06Q 30/0258; G06Q 30/0264; G06Q 30/0265; G06Q 30/0266; G06Q 30/0268; G06Q 30/0276; G06Q 30/0619; G06Q 30/0621; G06Q 30/0627; G06Q 30/0645; G06Q 40/00; G06Q 40/02; G06Q 40/08; G06Q 50/10; G06Q 50/165; G06Q 50/30; G06Q 50/32

See application file for complete search history.

(56) References Cited

U.S. PATENT DOCUMENTS

2013/0311356 A1\* 11/2013 Ho ....................... G06Q 20/123
705/39
2014/0188625 A1 7/2014 Bruce et al.
2016/0234302 A1 8/2016 Wu et al.

FOREIGN PATENT DOCUMENTS

CN 103973769 A 8/2014
WO WO-2014/210119 A2 12/2014

OTHER PUBLICATIONS

Search Report in International Application No. PCT/CN2016/079560 dated Jul. 11, 2016, 4 pages.
International Preliminary Report in Patentability and Written Opinion in International Application No. PCT/CN2016/079560 dated Oct. 24, 2017, 7 pages.

\* cited by examiner

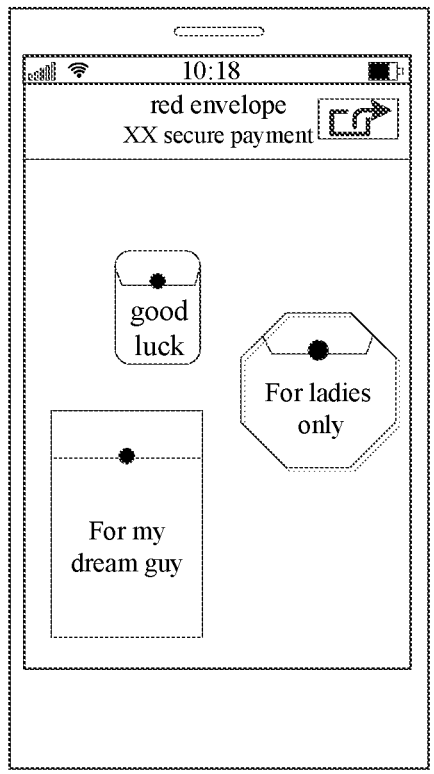

FIG. 5E generating n virtual packages through interacting with a server cluster, wherein each virtual package distributes a Part of resources to be dispensed to a receiving terminal, n is an integer larger than 1 — 602 providing a pick-up message of the n virtual packages to the receiving terminal, wherein the pick-up message specifies that the receiving terminal displays at least two virtual packages of the n virtual packages simultaneously in a user interface — 604

1219 Detects whether the receiving terminal is qualified to pick up the virtual package according to the pick-up request 1220 Detects whether the number of virtual packages that the receiving terminal picked up exceeds an upper limit when the receiving terminal is qualified to pick up the virtual package 1221 Sends the target virtual package to the receiving terminal when the number of virtual packages of a receiving terminal picked up does not exceed an upper limit;

1222 The receiving terminal sends a withdraw request to a payment server

1223 The payment server judges whether the receiving terminal finishes a register 1224 When the result of judging shows that the receiving terminal does not finish the register, the payment server sends a registration tip, the registration tip guides the receiving terminal to finishing the register 1225 The payment server obtains the bank card information corresponding to the receiving terminal when the result of judging shows that the receiving terminal finishes the register 1226 The payment server sends a verification request to the receiving terminal 1227 The receiving terminal sends the verification response carring the verification information to the payment server when receiving the verification information that a user of the receiving terminal inputs 1228 The payment server detects whether the verification information is correct 1229 Transfer the amount of cash carried by the withdraw request to the bank card corresponding to the receiving terminal when the result of detecting shows that the verification information is correct

RESOURCES DISPENSING DEVICE AND RESOURCES DISPENSING METHOD

The application claims priority to PCT Patent Application No. PCT/CN2016/079560, filed on Apr. 18, 2016, which claims the benefit of Chinese Patent Application No. 201510201454.X, filed on Apr. 24, 2015, entitled "Resources Dispensing System, Resources Dispensing Method and Resources Pick-up Method", which is incorporated herein by reference in its entirety.

TECHNICAL FIELD

The present disclosure relates to internet technologies, and more particularly, to a resources dispensing device, resources dispensing method.

BACKGROUND

With the development of network technology, each user may give others some resources such as virtual packages using a mobile terminal. The resources may be cash, points, network game equipment or pets of some network games.

For example, a user may use virtual packages as carriers to give cash to others. In this case, for example, a user may package some cash in m virtual packages provided by a client of a social application, and then send the m virtual packages to other n social application clients of his/her friends. Usually, m may be smaller than or equal to n. The social client application of each friend may display an unopened virtual package. The virtual package may be picked up and displays a random amount of cash when the friend clicks on the virtual package. If all of the m virtual packages are picked up, any other one clicks on the virtual package, a message of "All the virtual packages have been picked up" would be displayed.

When the number of the friends n is greater than the number of the virtual packages m, in order to timely pick up the virtual package, users may click the virtual package displayed on the social application client many times in a short time after the virtual packages have just been dispensed. And each click may trigger a pick-up request being submitted to a server from the social application client. For the m virtual packages, the server may receive more than 10*m pick-up requests in a short time, which causes a lot of stress for the server to deal with the pick-up requests. Moreover, clicking the same location on the mobile terminal quickly and frequently may cause a falling of the mobile terminal.

SUMMARY

In order to solve above problems, the present disclosure provides a resources dispensing system, resources dispensing method and resources pick-up method. The technical solutions are described as follows.

A system for dispensing resources according to a first aspect of some examples of the present disclosure includes: a sending terminal, a server cluster and at least one receiving terminal;

the sending terminal is to generate n virtual packages through interacting with the server cluster; wherein each virtual package is to distribute a part of resources to be dispensed to the receiving terminal; wherein n is an integer larger than 1;

the sending terminal is to provide a pick-up message of the n virtual packages to the receiving terminal;

the receiving terminal is to display at least two virtual packages of the n virtual packages in a user interface according to the pick-up message of the n virtual packages; and the receiving terminal is to pick up a target virtual package of the at least two virtual packages through interacting with the server cluster according to a pick-up operation received.

A method for dispensing resources according to some examples of the present disclosure includes:

generating n virtual packages; wherein, each virtual package distributes a part of resources to be dispensed to a receiving terminal; wherein n is an integer larger than 1; and providing a pick-up message of the n virtual packages to the receiving terminal; wherein the pick-up message specifies that the receiving terminal displays at least two virtual packages of the n virtual packages in a user interface.

A method for dispensing resources according to some examples of the present disclosure includes:

generating n virtual packages; wherein each virtual package distributes a part of resources to be dispensed to a receiving terminal; wherein, n is an integer larger than 1;

receiving a pick-up request sent by the receiving terminal; wherein the pick-up request is sent by the receiving terminal according to a pick-up operation received after the receiving terminal displays at least two virtual packages of the n virtual packages in a user interface according to the pick-up message of the n virtual packages; and sending a target virtual package to the receiving terminal according to pick-up request.

A sending terminal according to some examples of the present disclosure includes:

one or more processors;

memory;

one or more program instructions stored in the memory and executed by the one or more processors; wherein the one or more program instructions comprises:

generating n virtual packages, wherein, each virtual package is to distribute a part of resources to a receiving terminal; wherein n is an integer larger than 1;

providing a pick-up message of the n virtual packages to the receiving terminal; wherein the pick-up message specifies that the receiving terminal displays at least two virtual packages of the n virtual packages in a user interface.

A server cluster according to some examples of the present disclosure, including:

one or more processors;

memory;

one or more program instructions stored in the memory and executed by the one or more processors; wherein the one or more program instructions comprises:

generating n virtual packages; wherein each virtual package distributes a part of resources to be dispensed to a receiving terminal; wherein, n is an integer larger than 1;

receiving a pick-up request sent by the receiving terminal; wherein the pick-up request is sent by the receiving terminal to the server cluster according to a pick-up operation received after the receiving terminal displays at least two virtual packages of the n virtual packages in a user interface according to the pick-up message of the n virtual packages; and sending a target virtual package to the receiving terminal according to pick-up request.

According to the above method, terminal, and cluster, the receiver client may display at least two virtual packages of the n virtual packages simultaneously in the same user interface. This allows a user to selectively pick up one of the virtual packages, rather than frequently click on the same virtual package. The process of user's selection may reduce the number of the pick-up requests triggered by the user in a unit of time, then reduce the number and the frequency of invalid pick-up operation effectively, and thus reduce instantaneous loading stress for a server due to a large number of pick-up requests triggered in a short time.

BRIEF DESCRIPTION OF THE DRAWINGS

In order to more clearly illustrate the technical solutions according to the examples of the present disclosure, the drawings used in the description of the examples will be briefly introduced below. Apparently, the drawings used in the description below illustrate only partial examples of the present disclosure, and other drawings may be obtained by one of ordinary skills in the art in light of these described drawings without creative work.

FIG. 5A to 5E are schematic diagrams illustrating interfaces of a terminal displaying a virtual package according to some embodiments of the present disclosure;

FIG. 6 is a flowchart illustrating a method for dispensing resources according to some embodiments of the present disclosure;

DETAILED DESCRIPTION

In order to make the object, technical solution and merits of the present disclosure clearer, the present disclosure will be illustrated in detail hereinafter with reference to the accompanying drawings.

System Environment

Figure 1:
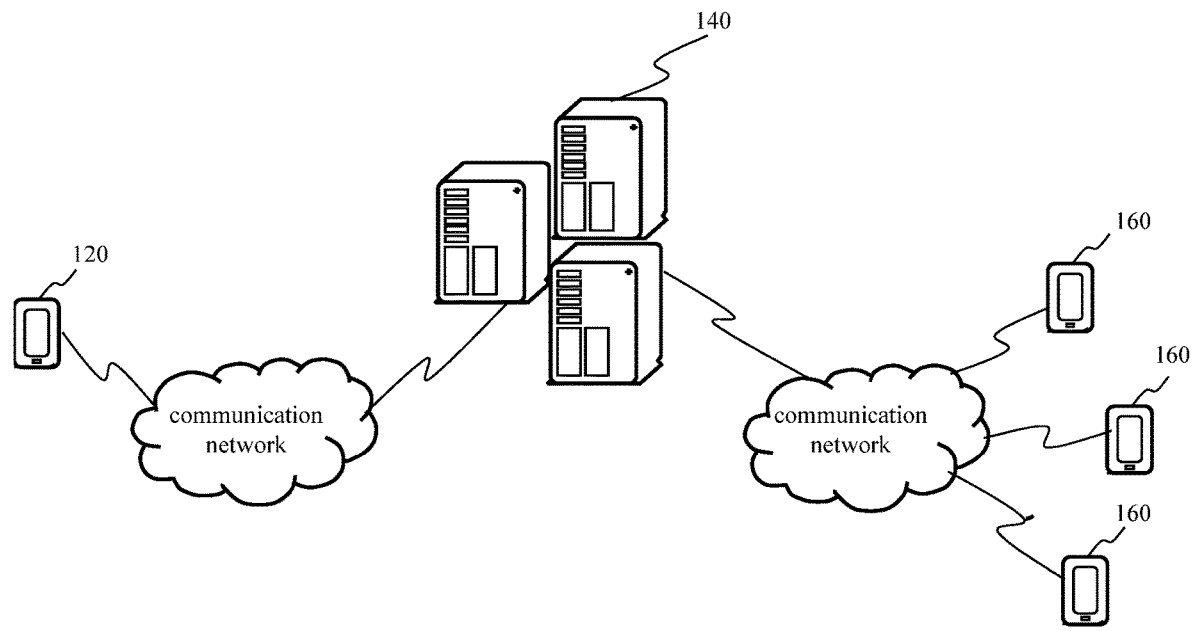
FIG. 1 is a schematic diagram illustrating the structure of a system for dispensing resources according to some embodiments of the present disclosure.

Referring to FIG. 1, FIG. 1 is a schematic diagram illustrating the structure of a system for dispensing resources according to some embodiments of the present disclosure. The system includes a sending terminal 120, a server cluster 140 and at least one receiving terminal 160.

A sender client is running on the sending terminal 120. The sending terminal 120 may be a phone, a tablet computer, an eBook reader, an MP3 (Moving Picture Experts Group Audio Layer III) player, an MP4 (Moving Picture Experts Group Audio Layer IV) player, a laptop portable computer or a desktop computer etc.

The sending terminal 120 may communicate with the server cluster 140 through a communication network. The communication network may be a wire network or a wireless network.

The server cluster 140 may be a server, or a server cluster consisted of a number of servers, or a cloud computing service center.

The server cluster 140 may communicate with the receiving terminal 160 through a wire network or a wireless network.

A receiver client may be running on each of the at least one receiving terminal 160. The receiving terminal 160 may be a phone, a tablet computer, an eBook reader, an MP3 (Moving Picture Experts Group Audio Layer III) player, an MP4 (Moving Picture Experts Group Audio Layer IV) player, a laptop portable computer or a desktop computer etc.

It should be noted that, the sender client and the receiver client may be social application clients, such as tweet client, WeChat client produced by Tencent Inc of China etc. The sender client and the receiver client may also be payment application client. The sender client and the receiver client may also be other clients, such as game client, read client, or client dedicated to dispensing virtual package etc. The types of the sender client and the receiver client are not limited by the examples of the present disclosure. The sender client and the receiver client may the same type of client, or different types of clients.

It should be noted that, in each examples of the present disclosure, the virtual package is also called a virtual red envelope, or an electronic red envelope. The virtual package is a virtual carrier transferring resources between at least two users in a giving way. The at least two users may be in a friendship, or in a focusing relationship, and/or in a group relationship in the social application or in the real world. The resources involved in the virtual package may be cash, game equipment, game materials, game pets, game currency, icons, membership, titles, value-added services, integration, sycee, gold beans, gift coupons, voucher, coupons, greeting cards, etc. The type of the resources carried by the virtual package is not limited by the examples of the present disclosure.

Figure 2:
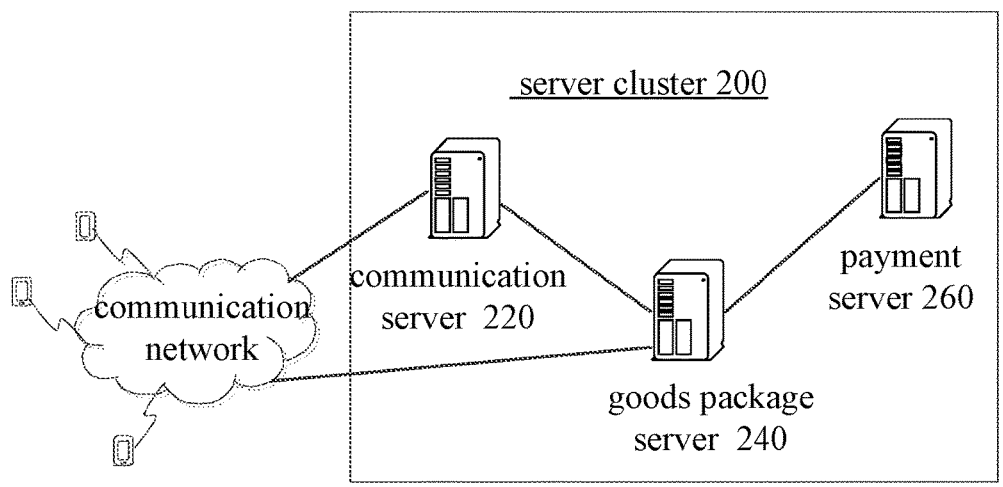
FIG. 2 is a schematic diagram illustrating the structure of a server cluster according to some embodiments of the present disclosure.

Now referring to FIG. 2, FIG. 2 is a schematic diagram illustrating the structure of a server cluster 200 according to some embodiments of the present disclosure. The server cluster 200 includes a communication server 220, a package server 240, and a payment server 260 in the exemplary example.

The communication server 220 is configured to provide communication services between the sender clients and receiver clients. The communication service may be text communication services, picture communication services, voice communication services, or video communication services, etc.

The package server 240 is configured to provide back supports of dispensing virtual packages, and docking with the payment server 260. For example, the package server 240 may be a server providing WeChat service of Tencent Inc. of China.

The payment server 260 is configured to provide resources transferring function of transferring the resources from an account of a receiver client in the package server 240 to a bank card of a receiver client. For example, the payment server 260 may be a server providing TenPay service of Tencent Inc of China.

Computer Architecture

Figure 3:
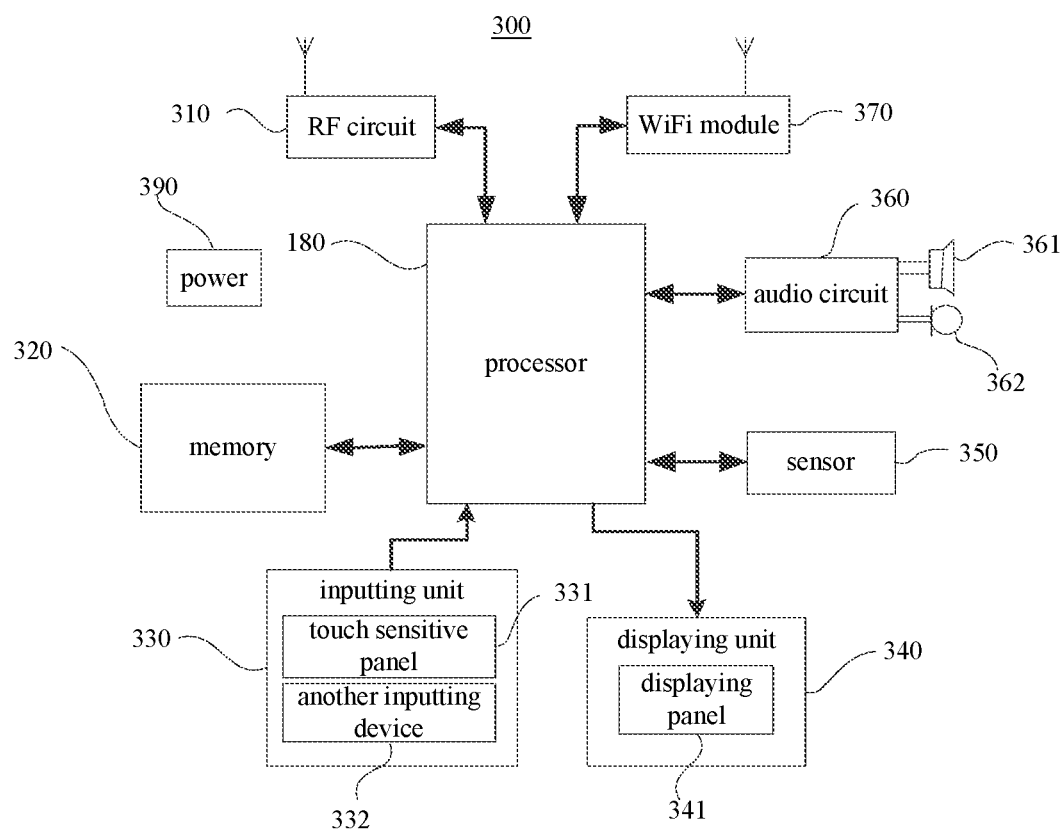
FIG. 3 is a schematic diagram illustrating the structure of a terminal according to some embodiments of the present disclosure.

FIG. 3 is a schematic diagram illustrating the structure of a terminal according to some embodiments of the present disclosure. The terminal may be the sending terminal 120 or the receiving terminal 160. In the sending terminal 120, a sender client is running, and in the receiving terminal 160, a receiver client is running.

Specifically, a terminal 300 may include: an RF (Radio Frequency) circuit 310, one or more storages 320 used as the computer readable storage medium, an inputting unit 330, a displaying unit 340, a sensor 350, an audio circuit 360, a short-range wireless transmission module 370, one or more processors 380 including one or more processing units and a power 390 etc. The skilled in the art can understand that the terminal is not limited by the structure of the terminal shown in FIG. 3, but can include more or less components than components in the structure shown in FIG. 3, or can combine some components in the structure shown in FIG. 3, or can have a component arrangement different from the component arrangement in the structure shown in FIG. 3.

The RF circuit 310 may transmit and receive signals during an information transmitting and receiving process or a call process. Particularly, the RF circuit 310 may receive downlink information from a base station and transmit the downlink information to the one or more processors 380. In addition, the RF circuit 310 may transmit uplink data to the base station. Usually, the RF circuit 310 includes, but is not limited to, an antenna, at least one amplifier, a tuner, one or more oscillators, a Subscriber Identity Module (SIM) card, a transceiver, a coupler, a Low Noise Amplifier (LNA), a duplexer etc. In addition, the RF circuit 310 may also communicate with a network and other communication devices through wireless communication. Any of communication standards or protocols may be used in the wireless communication, which include, but are not limited to, Global System of Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS) etc. The storage 320 may store software programs and modules. The processor 380 may operate the software programs and modules stored in the storage 320 to implement a variety of functional applications and data processing. The storage 320 may include: a program storage area and a data storage area, the program storage area may store an operation system and an application program for implementing at least one function (e.g., an audio playing function, a video playing function and so on). The data storage area may store data created when the terminal 300 is used (e.g., audio data, contact data and so on). In addition, the storage 320 may include a high-speed random access memory and a non-transitory memory such as at least one disk storage device, flash device or a transitory solid-state storage device. Accordingly, the storage 320 may also include a storage controller to provide the access to the storage 320 for the processor 380 and the inputting unit 330.

The inputting unit 330 may receive inputted numeral or character information, and generate input signals of a device of user configuration and function control, such as a keyboard, a mouse, an operating lever, optics or a trackball. Specifically, the inputting unit 330 may include a touch sensitive panel 331 and another inputting device 332. The touch sensitive panel 331 is also called a touch screen or a touch pad, and may collect a touch operation performed by a user on or near the touch sensitive panel 331 (e.g., the user performs an operation on or near the touch panel 331 with any suitable object or accessory such as a finger and a touchpen). And the inputting unit 330 may drive a connection device according to a preset program. The touch sensitive panel 331 may include a touch detection apparatus and a touch controller. The touch detection apparatus may detect a touch position of the user, detect a signal generated based on the touch operation, and transmit the signal to the touch controller. The touch controller may receive touch information from the touch detection apparatus, convert the touch information into a touch point coordinate, transmit the touch point coordinate to the processor 380, and receive and execute a command sent by the processor 380. In addition, the touch sensitive panel 331 may be implemented by multiple modes such as a resistive mode, a capacitive mode, an infrared mode or a surface acoustic wave mode. Besides the touch sensitive panel 331, the inputting unit 330 may further include another inputting device 332. Specifically, the inputting device 332 may include, but is not limited to, at least one of a physical keyboard, a function key (such as a volume control key, a switch key etc.), a trackball, a mouse and an operating lever.

The displaying unit 340 may display information inputted by the user or information provided to the user and various graphical user interfaces of the terminal 300. The graphical user interfaces may be constructed by graphics, texts, icons, videos, and any combination thereof. The displaying unit 340 may include a displaying panel 341, optionally, which may be configured by a Liquid Crystal Display (LCD) and an Organic Light-Emitting Diode (OLED). Furthermore, the displaying panel 341 may be covered with the touch sensitive panel 331. When detecting the touch operation on or near the touch sensitive panel 331, the touch sensitive panel 331 transmits the touch operation to the processor 380 to determine the type of the touch event. Afterwards, the processor 380 provides a video output on the displaying panel 341 according to the type of the touch event. Although the touch sensitive panel 331 and the displaying panel 341 are illustrated as two independent components to implement an inputting function and an outputting function respectively in FIG. 3, in some examples, the touch sensitive panel 331 and the displaying panel 341 may be integrated to implement the inputting function and the outputting function.

The terminal 300 may further include at least one sensor 350, such as a light sensor, a motion sensor and another kind of sensor. Specially, the light sensor may include an ambient light sensor and a proximity sensor. The ambient light sensor may adjust the brightness of the displaying panel 341 according to the brightness of ambient light. The proximity sensor may close the displaying panel 341 and/or become backlit when the terminal 300 is moved to an ear. As one kind of motion sensor, a gravity accelerometer sensor can detect a value of acceleration on all directions (typically three-axis). The gravity accelerometer sensor may detect the value and direction of gravity in stationary, identify a posture of a mobile phone (such as switch between a horizontal screen and a vertical screen, a related game, magnetometer posture calibration and so on), and implement a vibration recognition related function (such as a pedometer and a percussion). Another sensor such as a gyroscope, a barometer, a hygrometer, a thermometer and an infrared sensor may be configured in the terminal 300, which is not repeated here.

The audio circuit 360, the speaker 321 and the microphone 322 may provide an audio interface between the user and the terminal 300. The audio circuit 360 may transmit to the speaker 321 an electric signal transformed from received audio data. The speaker 321 transforms the electric signal to a sound signal and outputs the sound signal. On the other hand, the microphone 322 transforms the collected sound signal to an electric signal. The audio circuit 360 receives the electric signal, transforms the electric signal to audio data, and outputs the audio data to the processor 380. After the audio data is processed by the processor 380, the audio data is transmitted to a receiving device via the RF circuit 310, or is outputted to the storage 320 for further processing. The audio circuit 360 may also include a headset jack to provide communication between peripheral headset and the terminal 300.

The short-range wireless transmission module 370 may be a WiFi (wireless fidelity) module or a Bluetooth module. The terminal 300 may help a user transmit and receive an Email, browse a webpage and access a streaming media through the short-range wireless transmission module 370. The short-range wireless transmission module 370 may provide the user with an access to a wireless broadband internet. Though the short-range wireless transmission module 370 is shown in FIG. 3, in a particular application, the terminal 300 may not include the short-range wireless transmission module 370.

The processor 380 is a control center of the terminal 300. The processor 380 is connected with all components of the mobile phone via various interfaces and circuits, and may implement various functions and data processing of the terminal 300 through operating or executing the software programs and/or modules stored in the storage 320 and calling data stored in the storage 320, thereby overall monitoring the terminal 300. The processor 380 may include one or more processing units. The processor 380 may include an application processor and a modem processor. The application processor may process an operation system, a user interface and application programs. The modem processor may process wireless communication. It can be understand that the above processor 380 may also not include the modem processor.

The terminal 300 may further include a power 390 (e.g., battery) supplied electricity to each component, optionally, the power 390 may be connected with the processor 380 through a power management system, so as to manage such functions as charging, a discharging and power consumption through the power management system. The power 390 may also include one or more Direct Current (DC) or Alternating Current (AC) powers, a recharging system, a power failure detection circuit, a power converter or an inverter, a power status indicator etc.

The terminal 300 may further include a camera and a bluetooth module, which is not shown in FIG. 3.

The terminal 300 may further include a storage, one or more programs are stored in the storage, and are configured to be executed by the one or more processors to generate n virtual packages; wherein, each virtual package distributes a part of resources to be dispensed to a receiving terminal; wherein n is an integer larger than 1; and provide a pick-up message of the n virtual packages to the receiving terminal; wherein the pick-up message specifies that the receiving terminal displays at least two virtual packages of the n virtual packages in a user interface.

The one or more programs stored in the storage are further configured to be executed by the one or more processors to display at least two virtual packages of n virtual packages in a user interface; wherein n is an integer larger than 1; receive a pick-up operation through the user interface; pick up a target package from the at least two virtual packages according to the pick-up operation.

In some embodiments, the present disclosure also provides a non-transitory computer readable storage medium include instructions, for example, a storage include instructions, the instructions is executable by the processor of the terminal for implementing the method for dispensing resources or the method for picking up resources in the following examples. The non-transitory computer readable storage medium may be, such as, ROM, random access memory (RAM), magnetic tape, floppy disk, and optical data storage device, etc.

Figure 4:
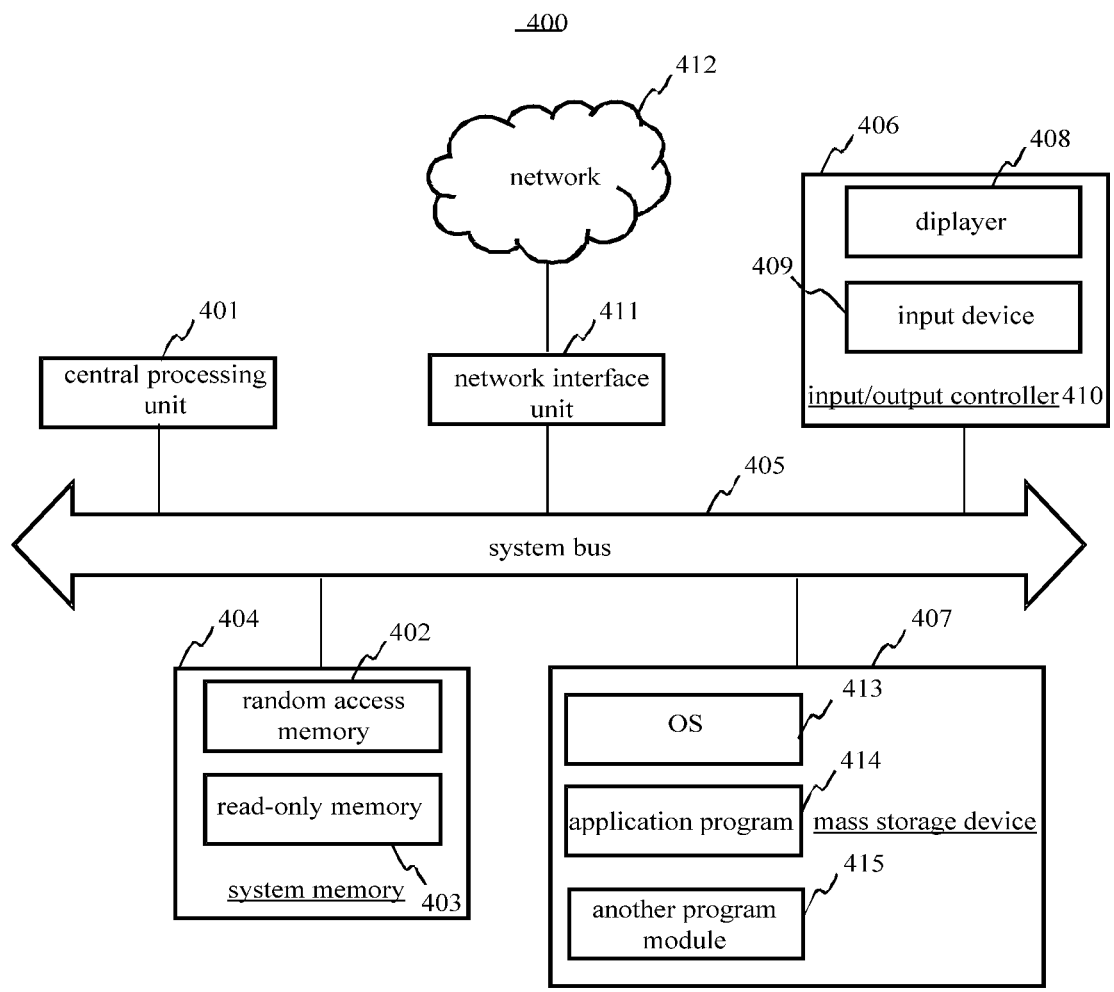
FIG. 4 is a schematic diagram illustrating the structure of a server according to some embodiments of the present disclosure.

FIG. 4 is a schematic diagram illustrating the structure of a server according to some embodiments of the present disclosure. The server may be one server of a server cluster 140.

Specifically, a server 400 may include a central processing unit (CPU) 401, system memory 404 including a random access memory (RAM) 402 and a read only memory (ROM) 403, and a system bus 405 connecting the system memory 404 with the central processing unit 401. The server 400 may also include a basic input/output system (I/O system) 406 helping transferring information between various devices within the computer. And the server 400 may also include a mass storage device 407 for storing an operating system 413, applications 414 and other program modules 415.

The basic input/output system 406 includes a display 408 for displaying information and an input device 409 for inputting information, such as mouse, keyboard etc. The display 408 and the input device 409 are connected to the central processing unit 401 by being connected to an input/output controller 410 of the system bus 405. The basic input/output system 406 may also include the input/output controller 410 for receiving and processing the input from a keyboard, a mouse, or electric stylus pen or multiple other devices. Similarly, the input/output controller 410 also provides output to screen, printer, or other types of output devices.

The mass storage device 407 is connecting to the central processing unit 401 by being connected to a mass storage controller (not shown) of the system bus 405. The mass storage device 407 and other related computer readable medium provide non-transitory storage for the server 400. In other words, the mass storage device 407 may include a computer readable medium such as a hard disk or a CD-ROM driver etc.

Without loss of generality, the computer readable medium may include a computer storage medium and a communication medium. The computer storage medium may include transitory and non-transitory medium, removable and non-removable medium for implementing any methods or techniques such as computer readable instructions, data structure, program modules or other data. The computer readable storage medium includes RAM, ROM, EPROM, EEPROM, flash memory or other solid-state storage technology, CD-ROM, DVD or other optical storage, cassette, magnetic tape, disk storage or other magnetic storage devices. Of course, the skilled in the art can know that the computer storage medium is not limited to the above. The system memory 404 and the mass storage device 407 can be called collectively storage.

According to various examples of the present disclosure, the server 400 may also connect to a remote computer on the network to run through a network such as an internet. That is, the server 400 may be connected to the network 412 by being connected to a network interface unit 411 of the system bus 405, or, also connected to other types of networks or remote computer system (not shown) by being connected to the network interface unit 411.

The storage may further include one or more programs, one or more programs are stored in the storage, and are configured to be executed by CPU to generate n virtual packages; wherein each virtual package distributes a part of resources to be dispensed to a receiving terminal; wherein, n is an integer larger than 1; receive a pick-up request sent by the receiving terminal; wherein the pick-up request is sent by the receiving terminal according to a pick-up operation received after the receiving terminal displays at least two virtual packages of the n virtual packages in a user interface according to the pick-up message of the n virtual packages; and send a target virtual package to the receiving terminal according to pick-up request.

In some embodiments, the present disclosure also provides a non-transitory computer readable storage medium include instructions, for example, a storage includes instructions, the instructions are executable by the processor of the server for implementing the method for dispensing resources or the method for picking up resources in the following examples. For example, the non-transitory computer readable storage medium may be, such as, ROM, random access memory (RAM), CD-ROM, magnetic tape, soft disk, and optical data storage device, etc.

EXAMPLES

The sending terminal 120 may generate n virtual packages through interacting with the server cluster 140, each virtual package is to distribute a part of the resources to be dispensed to the receiving terminal 160. Wherein, n is an integer larger than 1.

Specifically, the sending terminal 120 may send a generating request to the server cluster 140. Wherein, the generating request at least carries the amount of resources to be dispensed and the number of the virtual packages to be dispensed n. The generating request may also carry the assignment type of the resources dispensed among the virtual packages. Wherein, the assignment type may be in average or randomly. The generating request may also carry an upper limit of the number of the virtual packages that each receiving terminal may pick.

The server cluster 140 may generate n virtual packages according to the generating request, and distribute identifiers for the n virtual packages. When the assignment type is in average, the server cluster 140 divides the amount of resources to be dispensed by n, so as to obtain the amount of resources of each virtual package. When the assignment type is randomly, the server cluster 140 distributes the amount of resources to be dispensed randomly, so as to obtain the amount of resources of each virtual package randomly. It should be noted that, the amount of resources of each virtual package may be predetermined in the virtual packages generating process. Alternatively, the amount of resources of each virtual package may also be determined while the virtual package is picked up. The execution timing is not limited by the examples of the present disclosure.

In some examples, the n virtual packages have their own identifiers, i.e., a total of n identifiers. In some other examples, the virtual packages have the same identifier, i.e., n virtual package share the same identifier.

The server cluster 140 may feed back the identifier of the n virtual packages to the sending terminal 120. Or, the server cluster 140 may generate a pick-up message according to the identifier of the n virtual packages. In some examples, the pick-up message may be a webpage link. And there is at least one webpage content corresponding to the webpage link. And in each webpage content at least two virtual packages of the n virtual packages are displayed simultaneously.

Correspondingly, the sending terminal 120 may receive identifier of the n virtual packages fed back by the server cluster 140, and generate a pick-up message according to the identifier of the n virtual packages. Or the sending terminal 120 may receive the pick-up message fed back by the server cluster, and the pick-up message carries the identifier of the n virtual packages.

The sending terminal 120 may provide the pick-up message of the n virtual packages to the receiving terminal 160. The message may be provided in any one of the following ways: in instant messages, in a group message, in a shared message post to a social information sharing platform, in a shared message post to tweet information sharing platform and in a two-dimensional code.

The receiving terminal 160 may display at least two virtual packages of the n virtual packages simultaneously in a user interface according to the pick-up message of the n virtual packages, and pick up a target virtual package from the at least two virtual packages through interacting with the server cluster according to the pick-up message.

Specifically, the receiving terminal 160 may display the at least two virtual packages of the n virtual packages simultaneously in a user interface through the following two possible ways.

In the first way, the receiving terminal 160 may display the entire area or a partial area of a general pick-up interface according to the pick-up message of the n virtual packages. Wherein, the general pick-up interface may display the n virtual packages simultaneously.

The pick-up message may be a webpage link corresponding to one webpage content. The receiving terminal 160 may obtain and displays the webpage content corresponding to the webpage link. The receiving terminal 160 may display the entire area or a partial area of the general pick-up interface according to the webpage content. And the general pick-up interface may display all the virtual packages simultaneously.

When the area of the general pick-up interface is smaller than or equals to a displaying area of the screen of the receiving terminal 160, the receiving terminal 160 may display the entire area of the general pick-up interface.

Figure 5A:
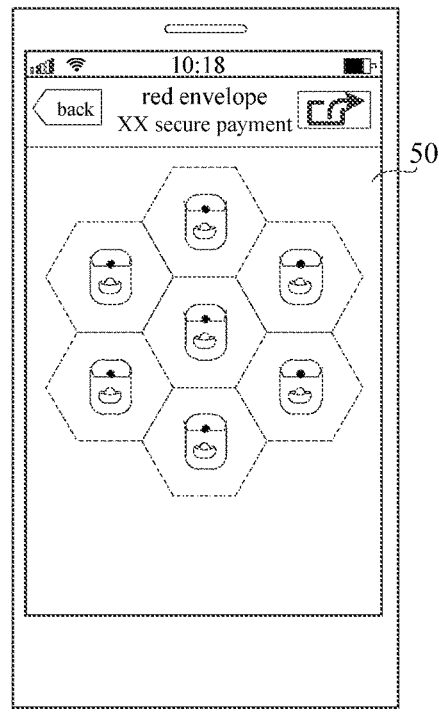

For example, referring to FIG. 5A, there are 7 virtual packages, the receiving terminal 160 may display 7 virtual packages simultaneously in the same user interface 50.

When the area of the general pick-up interface is larger than the displaying area of the screen of the receiving terminal, the receiving terminal 160 may display a partial area of the general pick-up interface. Then the receiving terminal 160 may display other areas of the general pick-up interface according to a translation instruction from a user.

Figure 5B:
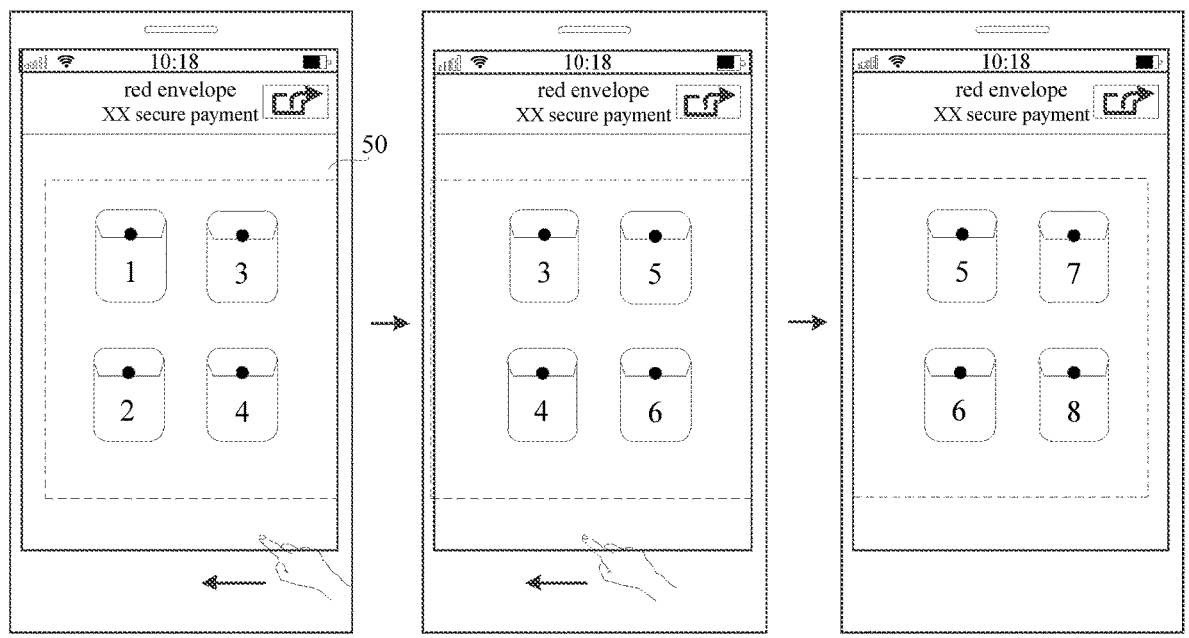

For example, referring to FIG. 5B, there are 8 virtual packages, the receiving terminal 160 displays the left half area of the user interface 50 first. In this area, virtual package 1-4 are displayed. And after receiving a translation instruction from the user, the middle area may be displayed. In this area, virtual package 3-6 are displayed. Or the right area may be displayed. In this area, virtual package 5-8 are displayed.

Arrangement of the displaying of the n virtual packages is not limited by the examples of the present disclosure. The virtual packages may be displayed in a regular tile form or in a honeycomb tile. For example, the virtual packages may be displayed according to row and column array. The virtual packages may also be displayed in the form of irregular tiles. For example, the virtual packages may be displayed in a random position. In some examples, the virtual packages usually do not mutually overlap each other.

In the second way, a first pick-up interface of m pick-up interfaces is displayed according to the pick-up message of the n virtual packages. And in each pick-up interface at least two virtual packages of the n virtual packages are displayed, wherein, m is an integer larger than 1.

The pick-up message may be a webpage link corresponding to m webpage contents. The receiving terminal 160 may obtain the m webpage contents corresponding to the webpage link. And the m webpage contents may be displayed as m pick-up interfaces, and in each pick-up interface at least two virtual packages of the n virtual packages would be displayed simultaneously. The receiving terminal 160 may display the first pick-up interface of the m pick-up interfaces at first. And when a switching operation from the user is received, the receiving terminal 160 may switch the first pick-up interface to a second pick-up interface of the m pick-up interfaces according to the switching operation. In some examples, the first and the second pick-up interfaces may refer to any two adjacent interfaces of the m pick-up interfaces.

Figure 5C:
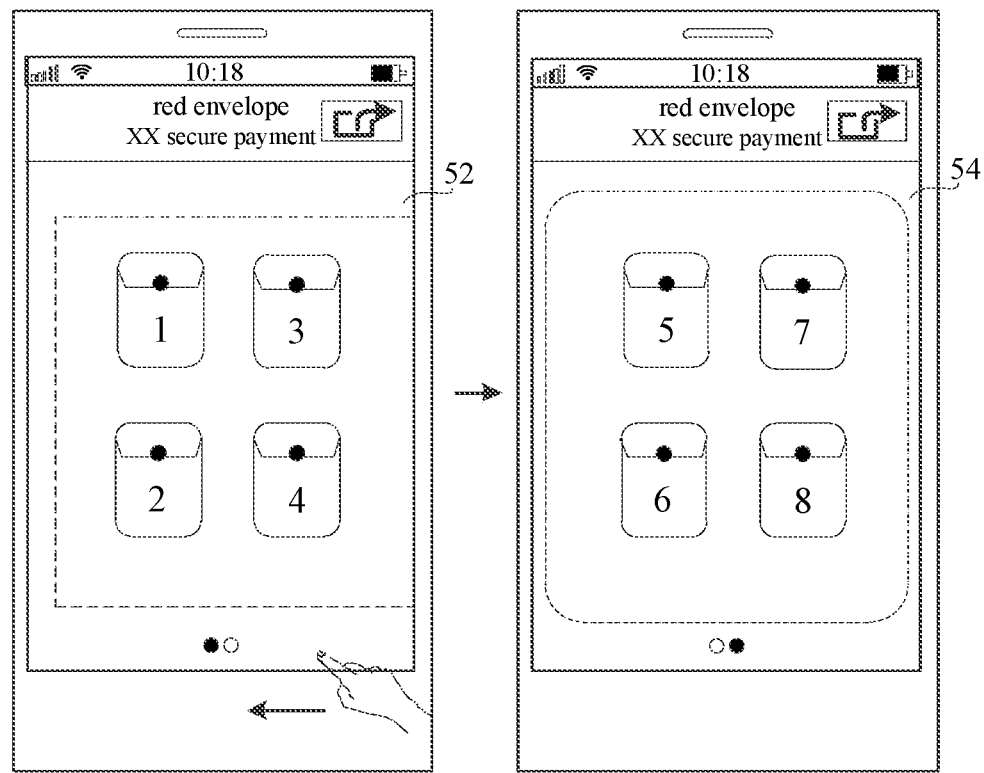
Figure 5D:
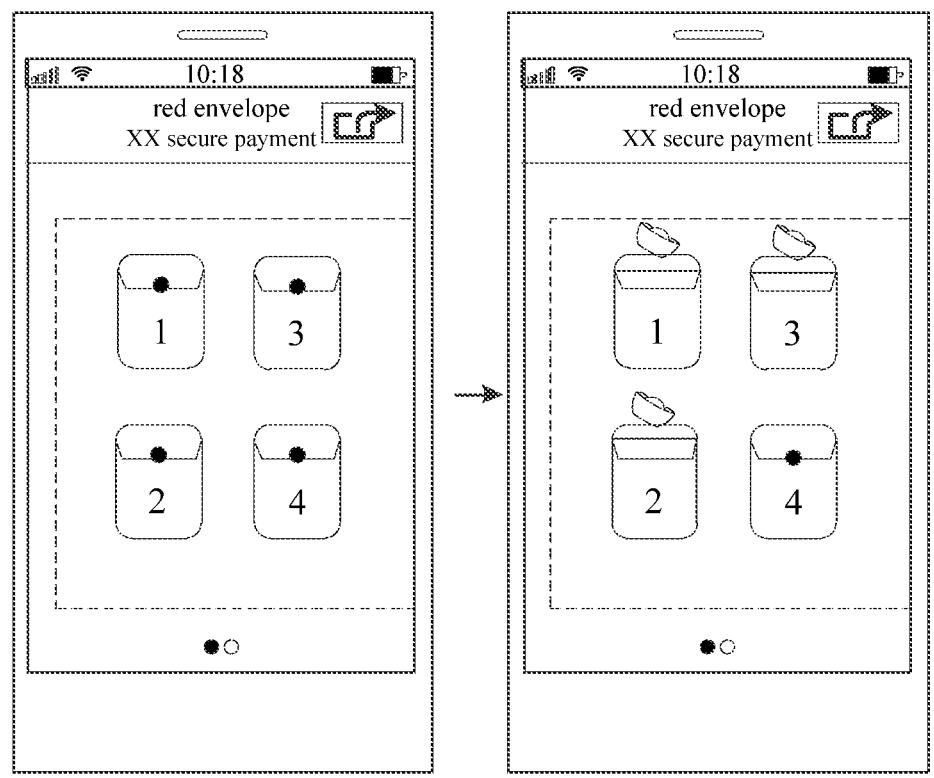

For example, referring now to FIG. 5C, there are 8 virtual packages, and there are 2 pick-up interfaces. The receiving terminal 160 may display the first pick-up interface 52 at first. And in the first pick-up interface 52, virtual package 1-4 are displayed. When a left slipping operation from the user is received, the receiving terminal 160 may display a second pick-up interface 54. And in the second pick-up interface 54, virtual package 5-8 are displayed.

The receiving terminal 160 may also obtain pick-up status of the n virtual packages from the server cluster 140 in the process of displaying the virtual packages. The pick-up status may include a status of having been picked up and a status of to be picked up. If a virtual package has already been picked up, the receiving terminal 160 may display the virtual package as an opened envelope. If a virtual package has not been picked up, the receiving terminal 160 may display the virtual package as an unopened envelope.

For example, referring now to 5D, the receiving terminal 160 may display the virtual packages 1-3 as opened envelopes for the virtual package 1-3 have already been picked up.

When the user wants to pick up a virtual package, a pick-up operation may be performed on the receiving terminal 160. The pick-up operation may be performed by a click operation of a virtual package on the touch screen of the receiving terminal 160.

The receiving terminal 160 then may send a pick-up request to the server cluster 140 according to the pick-up operation. And the pick-up request is to pick up a target virtual package from at least two virtual packages. The pick-up request may carry the identifier of the n virtual packages and the identifier of the receiving terminal 160. In case that each virtual package has its own identifier, the identifier of the target virtual package may be the identifier of virtual package selected by the pick-up operation. And the identifier of the selected virtual package is used to request the server cluster 140 to dispense the selected virtual package. In case that each virtual package share the same identifier, the same identifier is used to request the server cluster 140 to dispense one of the virtual packages which have not been picked up.

The server cluster 140 may send the target virtual package to the receiving terminal 160 according to the pick-up request. The server cluster 140 may detect whether the receiving terminal 160 is qualified to pick up any virtual package according to the pick-up request.

When the receiving terminal 160 is qualified to pick up a virtual package, the server cluster 140 may detect whether the number of the virtual packages picked up by the receiving terminal 160 has exceeded an upper limit. Usually, the receiving terminal 160 may be deemed as qualified to pick up the virtual package when the receiving terminal 160 and the sending terminal 120 are in a friendship and the time of picking up is in a valid time of the virtual package and so on.

If the number of the virtual packages picked up by the receiving terminal 160 does not exceed the upper limit, the server cluster 140 may send the target virtual package to the receiving terminal 160.

The receiving terminal 160 may receive the target virtual package sent by the server cluster 140. And the target virtual package may only be sent when the server cluster detects that the receiving terminal is qualified to pick up the virtual package and the number of the virtual packages picked up by the receiving terminal does not exceed the upper limit.

In summary, a system for dispensing resources is provided according to some embodiments of the present disclosure. And in this system the receiving terminal 160 may display at least two virtual packages of n virtual packages simultaneously in a user interface. This allows the user to selectively pick up one of the virtual packages, rather than frequently clicking on the same virtual package. And the process of the user's selection may also reduce the number of the pick-up requests triggered by the user in a unit of time, then reduce the number and the frequency of invalid pick-up operations effectively, and thus reduce instantaneous loading stress of the server due to a large number of pick-up requests triggered in a short time.

It should be noted that, the form of displaying the virtual packages is not limited by the examples of the present disclosure. Style and text description of virtual package may vary. For example, referring to FIG. 5E, the style of a virtual package may be rounded rectangle, rectangular, hexagonal and the like. The text description of virtual package may be: "Good Luck", "For Ladies Only", "For My Dream Guy" and etc.

To be noted, the style and text description of the virtual package may be customized by the user.

For illustrating in more detail, the following example of the method will be set forth how the resources dispensing system works. The following example of the method and the above-described examples of devices may combine with and reference to each other.

Referring to FIG. 6, FIG. 6 is a flowchart illustrating a method for dispensing resources according to some embodiments of the present disclosure. The example illustrates the method for dispensing resources being applied to the sending terminal as shown in FIG. 1. The method may include the following steps.

In block 602, n virtual packages are generated by interacting with the server cluster. Each virtual package is to distribute a part of resources to be dispensed to a receiving terminal. And n is an integer larger than 1.

In block 604, a pick-up message of the n virtual packages is provided to the receiving terminal. And the pick-up message specifies that the receiving terminal displays at least two virtual packages of the n virtual packages simultaneously in a user interface.

In summary, a method for dispensing resources according to some embodiments of the present disclosure is provided. By providing a pick-up message of the n virtual packages to the receiving terminal, and the pick-up message specifying that the receiving terminal should display at least two virtual packages of the n virtual packages simultaneously in a user interface, a user is allowed to selectively pick up one of the virtual packages, rather than frequently click on the same virtual package. The process of the user's selection may reduce the number of the pick-up requests triggered by the user in a unit of time, then reduce the number and the frequency of invalid pick-up operation, and thus reduce instantaneous loading stress of the server due to a large number of pick-up requests triggered in a short time.

Figure 7:
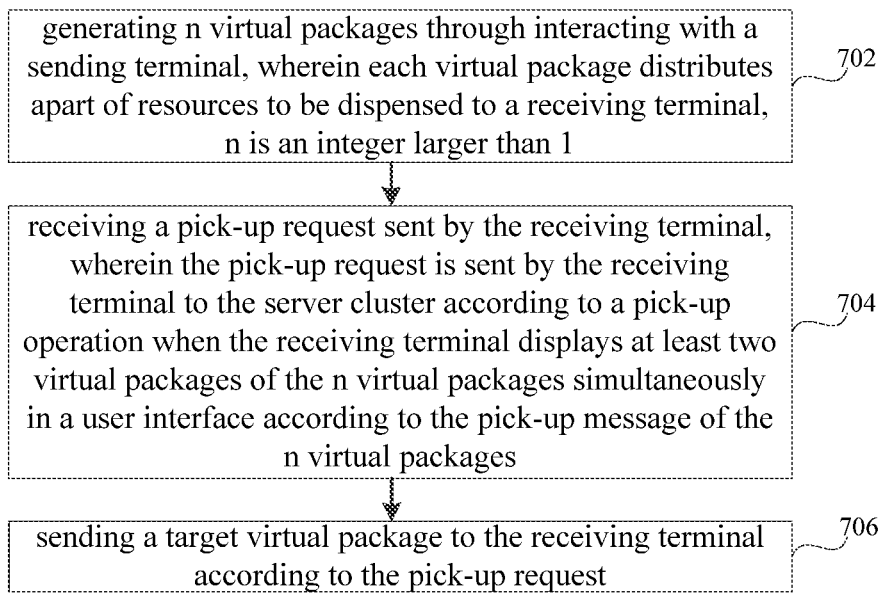
FIG. 7 is a flowchart illustrating a method for dispensing resources according to some embodiments of the present disclosure.

Referring to FIG. 7, FIG. 7 is a flowchart illustrating a method for dispensing resources according to some embodiments of the present disclosure. The example illustrates the method for dispensing resources being applied to the server cluster as shown in FIG. 1. The method may include the following steps.

In block 702, n virtual packages are generated by interacting with a sending terminal through a communication network. Wherein, each virtual package distributes a part of resources to be dispensed to a receiving terminal, and n is an integer larger than 1.

In block 704, a pick-up request sent by the receiving terminal is received through the communication network. The pick-up request is sent by the receiving terminal to the server cluster according to a pick-up operation when the receiving terminal displays at least two virtual packages of the n virtual packages simultaneously in a user interface according to the pick-up message of the n virtual packages.

In block 706, a target virtual package is sent to the receiving terminal according to the pick-up request.

In summary, a method for dispensing resources according to some embodiments of the present disclosure is provided. In this method the pick-up request is sent to the server cluster after the receiving terminal displays at least two virtual packages of the n virtual packages simultaneously in a user interface according to a pick-up operation. The pick-up operation is that a user selectively picks up one of the virtual packages, rather than frequently click on the same virtual package. The process of the user's selection may reduce the number of the pick-up requests triggered by the user in a unit of time, then reduce the number and the frequency of invalid pick-up operation effectively, and thus reduce instantaneous loading stress of the server due to a large number of pick-up requests triggered in a short time.

Figure 8:
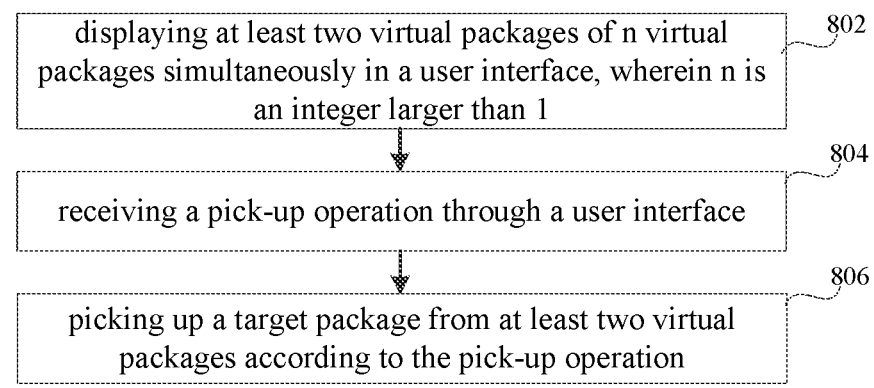
FIG. 8 is a flowchart illustrating a method for dispensing resources according to some embodiments of the present disclosure.

Referring to FIG. 8, FIG. 8 is a flowchart illustrating a method for dispensing resources according to some embodiments of the present disclosure. The example illustrates the method for dispensing resources being applied to the receiving terminal as shown in FIG. 1. The method may include the following steps.

In block 802, at least two virtual packages of n virtual packages are displayed simultaneously in a user interface, wherein n is an integer larger than 1;

In block 804, a pick-up operation is received through the user interface;

In block 806, a target virtual package of the at least two virtual packages is picked up according to the pick-up operation.

In summary, a method for dispensing resources according to some embodiments of the present disclosure is provided. In this method, the receiving terminal may display at least two virtual packages of the n virtual packages simultaneously in a user interface. This operation allows the user to selectively pick up one of the virtual packages, rather than frequently click on the same virtual package. The process of user's selection may reduce the number of the pick-up requests triggered by the user in a unit of time, then reduce the number and the frequency of invalid pick-up operation effectively, and thus reduce instantaneous loading stress of the server due to a large number of pick-up requests triggered in a short time.

Figure 9A:
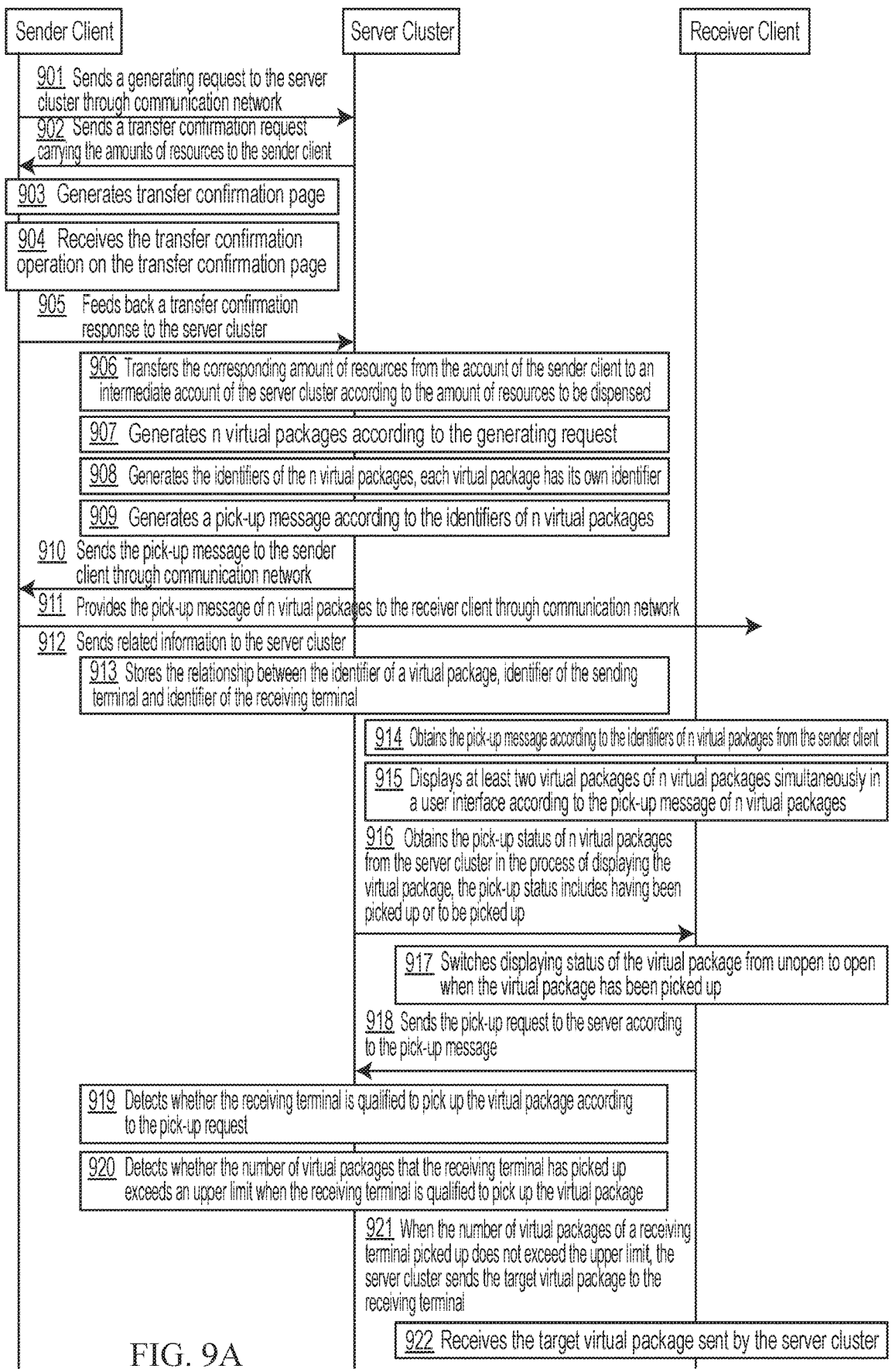
FIG. 9A is a flowchart illustrating a method for dispensing resources according to some embodiments of the present disclosure.

Referring now to FIG. 9A, FIG. 9A is a flowchart illustrating a method for dispensing resources according to some embodiments of the present disclosure. The example illustrates the method for dispensing resources being applied to the receiving terminal as shown in FIG. 1. The method may include the following steps.

In block 901, a sending terminal sends a generating request to a server cluster through a communication network.

In this block, the sending terminal sends to the server cluster a generating request carrying parameters of virtual packages. The user of the sending terminal may input parameters of the virtual packages in a generating interface provided by the sending terminal. Then the sending terminal may send the generating request carrying the parameters of the virtual package to the server cluster.

The parameters of the virtual packages may at least include the amount of resources to be dispensed s and the number of virtual packages to be dispensed n.

The amount of resources to be dispensed is the total amount of resources to be dispensed. For example, the resources may be cash, and the total amount may be 200 yuan.

The number of the virtual packages n is the number of carriers of the resources to be dispensed. Usually there may be two or more carriers.

The parameters of the virtual packages may further include an upper limit of the number of the virtual packages that each receiving terminal may pick up.

Setting the upper limit of the number of the virtual packages that can be picked up is to prevent that one receiving terminal picks up all the n virtual packages. The upper limit is an integer, and 1≤the upper limit≤n. The upper limit is an optional parameter. Alternatively, the upper limit may be a default value set by the server cluster.

The parameters of virtual package may further include assignment type of resources in virtual packages. The assignment type may refer to assigning in average or assigning randomly. When the assignment type is assigning in average, the amount of resources in each virtual package may equal a ratio of the amount of resources to be dispensed s and the number of virtual packages n. When the assignment type is assigning randomly, the amount of resources in each virtual package may be distributed randomly. And the sum of the resources in n virtual packages may equal the amount of resources to be dispensed s.

Figure 9B:
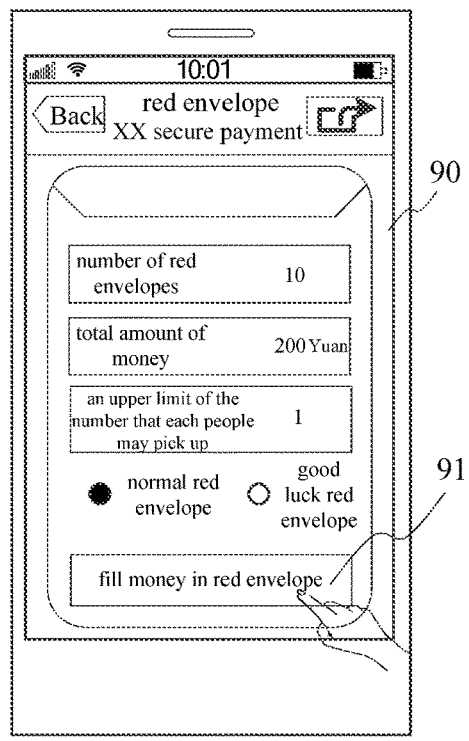
FIG. 9B to 9D are schematic diagrams illustrating interfaces of a terminal while implementing the method for dispensing resources illustrated in FIG. 9A.

Referring now to FIG. 9B, in the left side of FIG. 9B a diagram of the generating interface 90 is illustrated. The user may input the number of "virtual red envelopes", the total amount of money in the "virtual red envelopes", the upper limit of the number of the "virtual red envelopes" for each people, the type of red envelope is "normal" red envelope or "good luck" red envelope in the generating interface 90 displayed on the sending terminal. When the user clicks the "fill money in red envelopes" button 91, the sending terminal may send a generating request to the server cluster. To be noted, the type of the virtual package corresponding to "normal" red envelope refers to assigning in average, and the type corresponding to "good luck" red envelope refers to assigning randomly.

In some examples, the sending terminal may set a predetermined threshold value in advance. When the average amount of virtual goods (resources) in one virtual package or a fixed amount of virtual goods in one virtual package f is greater than the predetermined threshold value, the sending terminal may display a message to the user. The message is to prompt the user of the sending terminal to modify the total amount of virtual goods or to modify the fixed amount of virtual goods in each virtual package, so that the amount of virtual goods in each virtual package is not too large.

Correspondingly, the server cluster may receive the generating request of virtual packages carrying the parameters of the virtual packages sent by the sending terminal.

In some examples, the sending terminal may set a maximum threshold value in advance. When the average amount or the random amount of virtual goods in each virtual package is greater than the maximum threshold value, the sending terminal may display a message. The message is to prompt the user of sending terminal to modify the amount of virtual goods, so that the amount of virtual goods in each virtual package is not too large.

In block 902, the server cluster sends a transfer confirmation request carrying the amount of resources to be dispensed s to the sending terminal.

After receiving the generating request, the server cluster reads the parameters of the virtual packages from the generating request, and sends a transfer confirmation request carrying the amount of resources to be dispensed s to the sending terminal.

The transfer confirmation request may inform the user of the sending terminal of the total amount of resources that it takes to generate the n virtual packages, and request the user to confirm the transferring of the corresponding amount of resources from the account of the user of the sending terminal to an intermediate account of the server cluster. Specifically, when the virtual package is a cash red envelope, the total amount of resources is the total amount of money that takes.

Correspondingly, the sending terminal receives the transfer confirmation request carrying the amount of resources to be dispensed s sent by the server cluster.

In block 903, the sending terminal generates a transfer confirmation page.

After receiving the transfer confirmation request, the sending terminal generates a transfer confirmation page to inform the user of the sending terminal of the amount of resources to be dispensed and seek confirmation of the user of the sending terminal.

The user of the sending terminal may trigger the transfer confirmation operation on sending terminal, and authorize the server cluster to transfer the amount of resources to be dispensed from the account of the user of the sending terminal to an intermediate account of the server cluster.

In block 904, the sending terminal receives the transfer confirmation operation performed on the transfer confirmation page.

The sending terminal receives the transfer confirmation operation of the user of the sending terminal performed on the transfer confirmation page. The transfer confirmation operation means that the user of the sending terminal confirms the transfer operation related to the resources, and agrees the server cluster to extract the corresponding amount of resources from the account of the user of the sending terminal in following blocks.

In block 905, the sending terminal feeds back a transfer confirmation response to the server cluster.

After receiving the transfer confirmation operation, the sending terminal feeds back a transfer confirmation response to the server cluster.

Correspondingly, the server cluster receives the transfer confirmation response fed back by the sending terminal.

Figure 9C:
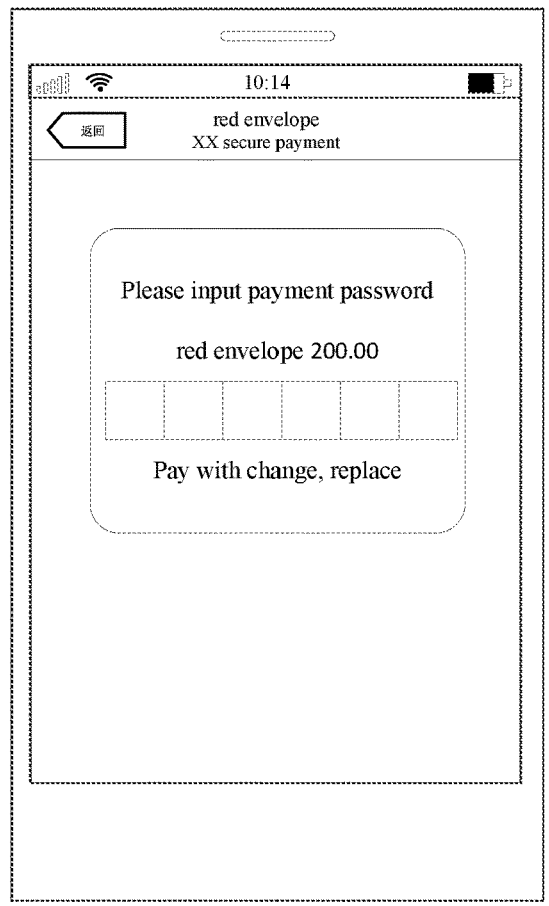

For example, referring to FIG. 9C, a user inputs a payment password on the transfer confirmation page 92 and click "OK" button 93. Then the sending terminal feeds back a transfer confirmation response to the server cluster.

In block 906, the server cluster transfers the corresponding amount of resources from the account of the sending terminal to the intermediate account of the server cluster according to the amount of resources to be dispensed.

After receiving the transfer confirmation response, the server cluster transfers the corresponding amount of resources s from the account of the sending terminal to the account corresponding to the server cluster.

For example, when the total amount of 8 virtual packages is 200, the server cluster extracts 200 yuan from an online bank account or an online payment account of the user of the sending terminal, and transfers 200 yuan to an intermediate account corresponding to the server cluster.

In block 907, the server cluster generates n virtual packages according to the generating request.

After finishing the transfer operation, the server cluster generates n virtual packages according to the parameters of the n virtual packages. Each virtual package is to distribute a part of resources to be dispensed to a receiving terminal, and n is an integer greater than 1.

When the assignment type of resources is assigning in average, the server cluster distributes the amount of the resources to each virtual package equally.

When the assignment type of resources is assigning randomly, the server cluster distributes the amount of the resources to each virtual package randomly.

It should be noted that, the amount of each virtual package may be predetermined in the virtual packages generating process, or in the virtual package picking up process. And the execution timing is not limited by the examples of the present disclosure.

In block 908, the server cluster generates identifiers of the n virtual packages. Wherein, each virtual package may have its own identifier.

The server cluster generates the identifiers of the n virtual packages.

For each virtual package, the server cluster may generate one unique identifier. The identifier of the virtual package is to identify a virtual package uniquely. Namely, n virtual packages have their own identifiers respectively.

In some examples, an identifier of a virtual package may be divided into two parts: a package group number and a package sub-number. The package group number is the identifier field shared by the n virtual packages generated at the same time. The package sub-number is the identifier field distinguishing each package of the n virtual packages generated at the same time.

For example, the identifiers of 8 virtual packages may be: 150417003-01, 150417003-02, 150417003-03, 150417003-04, 150417003-05, 150417003-06, 150417003-07, and 150417003-08.

Wherein, 150417003 is a package group number. In some examples, the package group number may be consisted of a time stamp and a serial number. Wherein, 01-08 are package sub-numbers.

In block 909, the server cluster generates a pick-up message according to the identifiers of the n virtual packages.

The pick-up message may be a webpage link. And there is at least one webpage content corresponding to the webpage link. And in each webpage content at least two virtual packages of the n virtual packages may be displayed simultaneously.

The server cluster may generate a webpage according to the identifiers of the n virtual packages. The webpage is to display the n virtual packages, and each virtual package has its own identifier. Then the server cluster may take the webpage link of the webpage as the pick-up message.

In block 910, the server cluster sends the pick-up message to the sending terminal through the communication network.

Correspondingly, the sending terminal receives the pick-up message.

In block 911, the sending terminal provides the pick-up message of the n virtual packages to the receiving terminal.

The sending terminal may provide the pick-up message to at least one receiver. Because the sending terminal and the receiving terminal are all social application clients, the sending terminal may determines and provides the pick-up message to at least one receiver according to a friendship, a focusing relationship, and/or a group relationship with the receiving terminal established before. After receiving the pick-up message, the receiving terminal may obtain the virtual packages corresponding to the pick-up message.

In addition, the pick-up message may be carried by various forms of carriers, such as in an instant message, in a group message, by information sharing, in a tweet message or in a two-dimensional code, and so on. Specifically, there may be several possible ways.

In a first possible way, the sending terminal may send the pick-up message of the n virtual packages to at least one receiving terminal in instant messages.

The instant messages may be text or graphic messages sent between two users who are in instant messaging.

In a second possible way, the sending terminal may send the pick-up message of the n virtual packages to at least one receiving terminal in a group message.

Figure 9D:
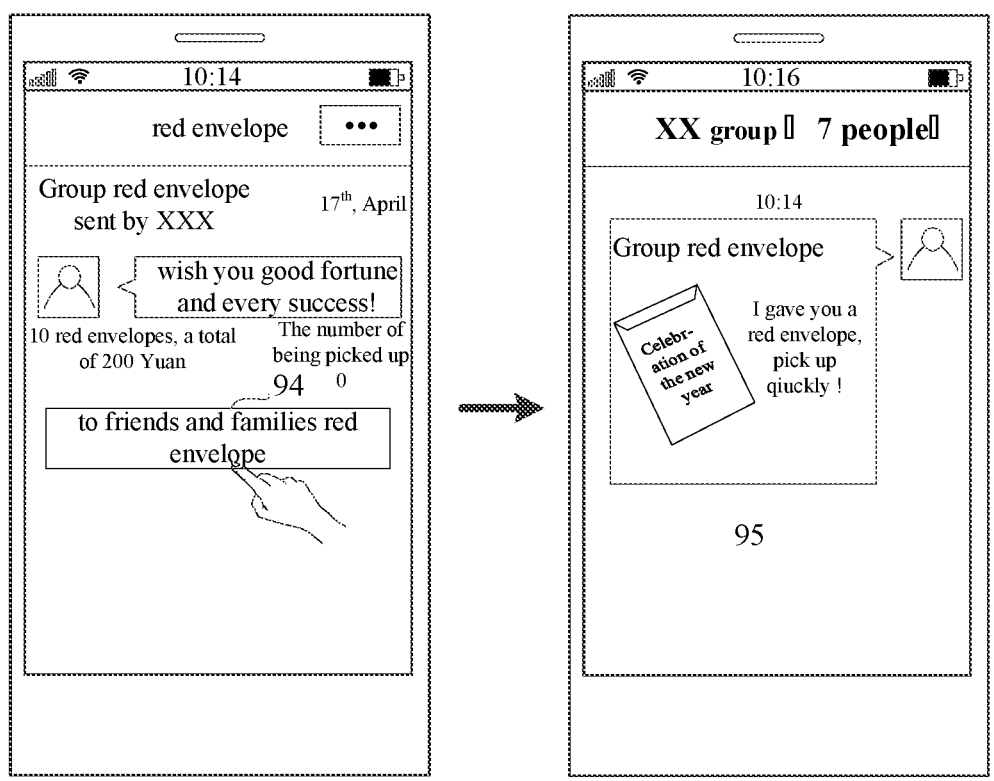

Referring to FIG. 9D, FIG. 9D is a schematic diagram illustrating the interface in which the user of the sending terminal sends a pick-up message to a user of receiving terminal in a group message. When the server cluster generates the n virtual packages successfully, the user of the sending terminal may click the "to friends and families red envelopes" button 94 in the corresponding page, and select an appropriate group under the guidance of the sending terminal, then may send the pick-up message to the friends in the group in a group message 95.

In a third possible way, the sending terminal may display the pick-up message of the n virtual packages on a social information sharing platform of the sending terminal. And the information of the social information sharing platform of the sending terminal may be subjected to a receiving terminal which is in a friendship with the sending terminal and is also qualified to access the information on the social information sharing platform of the sending terminal.

For example, the social information sharing platform may refer to a QQ zone or WeChat moments.

In a fourth possible way, the sending terminal may display the pick-up message of the n virtual packages on a tweet information sharing platform of the sending terminal. And the information of the tweet information sharing platform of the sending terminal may be subjected to a receiving terminal being qualified to access the information on the tweet information sharing platform of the sending terminal.

In a fifth possible way, the sending terminal may display the pick-up message of the n virtual packages on the sending terminal in a two-dimensional code. And the two-dimensional code may be scanned by at least one receiving terminal.

The above method taking a two-dimensional code as a carrier to carry the pick-up message is only applicable in the scenario that the user of the sending terminal and the user of the receiving terminal are in the same place. In this method, the receiving terminal may scan the two-dimensional code and then obtain the pick-up information from the two-dimensional code.

In some examples, the two-dimensional code may be scanned, but the pick-up message may only be obtained by the receiving terminal in a friend relationship with the sending terminal. But it is only a preferred implementation. In other possible implementations, the receiving terminal which is not in a friend relationship with the sending terminal may also scan the two-dimensional code and obtain the pick-up message. No particularly limited in made on this aspect.

In block 912, the sending terminal sends related information to the server cluster.

In some examples, after displaying the pick-up message to the receiving terminal, the sending terminal may need to send related information to the server cluster, in order to inform the server cluster of the scope of the receiving terminals qualified to obtain the pick-up message.

The related information may include the identifier of the n virtual package corresponding to the pick-up message, the identifier of the sending terminal and the identifier of each receiving terminal. The identifier of the sending terminal is to identify the sending terminal uniquely, and different identifiers of the sending terminals correspond to different sending terminals. The identifier of the receiving terminal is to identify the receiving terminal uniquely, and different identifiers of the receiving terminals correspond to different receiving terminals.

For example, when a sending terminal sends a group message carrying the pick-up message to the receiving terminals in the same group, the related information may be sent by the sending terminal or a communication server responsible for communicating service to the server cluster.

It should be noted that, when the pick-up message is displayed on at least one receiving terminal as instant messages or a group message, the related information may include the identifier of the n virtual package, the identifier of the sending terminal and the identifier of each receiving terminal. When the pick-up message is displayed on at least one receiving terminal in information shared, a tweet message or a two-dimensional code, the related information may include the identifiers of the n virtual packages, the identifier of the sending terminal and the identifier of the receiving terminal. In this case, the identifier of each receiving terminal should show that the receiving terminal is in a friend relationship with the sending terminal. Or the related information may include the identifier of the n virtual package and the identifier of the sending terminal. In this case, any receiving terminal may be qualified to obtain the n virtual packages. In the above examples, the related information includes the identifiers of the n virtual packages, the identifier of the sending terminal and the identifier of the receiving terminal. To be noted, this is only some embodiments and does not intend to limit the scope of the disclosure.

Correspondingly, the server cluster receives the related information sent by the sending terminal.

In block 913, the server cluster stores the relationship among the identifier of the n virtual packages, the identifier of the sending terminal and the identifier of the receiving terminal.

After receiving the related information, the server cluster may store the relationship among the identifier of the n virtual packages, the identifier of the sending terminal and the identifier of the receiving terminal.

In block 914, the receiving terminal obtains the pick-up message of the n virtual packages from the sending terminal.

The process of the obtaining may be transferred by the server cluster.

Specifically, corresponding to the above five possible ways of displaying the pick-up message, the receiving terminal may also receive the pick-up message through the following five possible ways.

In a first possible way, the receiving terminal may receive the pick-up message sent by the sending terminal in an instant message.

In a second possible way, the receiving terminal may receive the pick-up message sent by the sending terminal in a group message.

In a third possible way, the receiving terminal may receive the pick-up message displayed on a social information sharing platform of the sending terminal.

In a fourth possible way, the receiving terminal may receive the pick-up message displayed in a tweet information sharing platform of the sending terminal.

In a fifth possible way, the receiving terminal may scan the two-dimensional code displayed in the interface of the sending terminal and obtain the pick-up message.

In block 915, the receiving terminal displays at least two virtual packages of the n virtual packages simultaneously in a user interface according to the pick-up message of the n virtual packages.

In block 915, there are the following two possible ways to display the at least two virtual packages.

In the first possible way, the receiving terminal may display the entire area or a partial area of a general pick-up interface according to the pick-up message of the n virtual packages. And the general pick-up interface may display the n virtual packages simultaneously.

In some examples, the pick-up message is a webpage link corresponding to one webpage content. The receiving terminal may obtain and display the webpage content corresponding to the webpage link. The receiving terminal may display the entire area or a partial area of the general pick-up interface according to the webpage content, and in the general pick-up interface, all the virtual packages are displayed.

When the area of the general pick-up interface is smaller than or equals to a displaying area of the screen of the terminal, the receiving terminal 160 may display the entire area of the general pick-up interface.

For example, referring to 5A, there are 4 virtual packages, the receiving terminal 160 may display 4 virtual packages simultaneously in the same user interface When the area of the general pick-up interface is larger than the displaying area of the screen of the terminal, the receiving terminal 160 may display a partial area of the general pick-up interface. Then the receiving terminal 160 may move to and display other areas of the general pick-up interface according to a translation instruction received from the user.

For example, referring now to 5B, there are 8 virtual packages, the receiving terminal 160 may display the left half area of the user interface 50 first. In this area, virtual package 1-4 are displayed. And after receiving the user's translation instruction, the receiving terminal 160 may move to and display the middle area. In this area, virtual package 3-6 are displayed. Or the receiving terminal 160 may move to and display the right area. In this area, virtual package 5-8 are displayed.

Arrangement of the displaying of the n virtual packages should not be limited by the examples of the present disclosure. The virtual packages may be displayed in a regular tile form or in honeycomb tile. For example the virtual packages may be displayed according to row and column array. The virtual packages may also be displayed in the form of irregular tiles. For example, the virtual packages may be displayed in a random position. In some examples, the virtual packages usually do not mutually overlap each other.

In the second possible way, a first pick-up interface of m pick-up interfaces is displayed according to the pick-up message of the n virtual packages. And in each pick-up interface at least two virtual packages of the n virtual packages are displayed, wherein, m is an integer larger than 1.

In some examples, the pick-up message may be a webpage link corresponding to m webpage contents. The receiving terminal 160 may obtain the m webpage contents corresponding to the webpage link. And the m webpage contents may be displayed as m pick-up interfaces. And in each pick-up interface at least two virtual packages of the n virtual packages would be displayed simultaneously. The receiving terminal 160 may display the first pick-up interface of the m pick-up interfaces at first. And when a switching operation from the user is received, the receiving terminal 160 may switch the first pick-up interface to a second pick-up interface of the m pick-up interfaces according to the switching operation. In this example, the first and the second pick-up interfaces may refer to any two adjacent interfaces of the m pick-up interfaces.

For example, referring now to FIG. 5C, there are 8 virtual packages, and there are 2 pick-up interfaces. The receiving terminal 160 may display the first pick-up interface 52 at first. And in the first pick-up interface 52, virtual package 1-4 are displayed. When a left slipping operation from the user is received, the receiving terminal 160 may display a second pick-up interface 54. And in the second pick-up interface 54, virtual package 5-8 are displayed.

In block 916, the receiving terminal obtains the pick-up status of the n virtual packages from the server cluster in the process of displaying the virtual packages. The pick-up status may include a status of having been picked up and a status of to be picked up.

The receiving terminal may maintain a long time connection with the server cluster in the process of displaying the virtual packages, and obtain the pick-up status of the n virtual packages through the long time connection in real time. Alternatively, the receiving terminal may update regularly the pick-up status of the n virtual packages through the long time connection. Or, the receiving terminal may refresh the pick-up status of the n virtual packages upon receiving the user's operation.

The pick-up status of each virtual package may use the form of identifier plus status value. For example, "20150417003-01, 1" means that the pick-up status of the virtual package with the identifier 20150417003-01 is having been picked up; "20150417003-02, 0" means that the pick-up status of the virtual package with the identifier 20150417003-02 is to be picked up.

In block 917, for each virtual package that has already been picked up, the receiving terminal may display the virtual package as an opened envelope.

For example, referring to 5D, the receiving terminal 160 may display the virtual packages 1-3 as opened envelopes for the virtual package 1-3 have been picked up.

In block 918, the receiving terminal sends the pick-up request to the server according to the pick-up message.

The receiving terminal may extract the identifier of the virtual package from the pick-up message, and send the pick-up request carrying the identifier of the receiving terminal and the identifier of the virtual package to the server cluster. The identifier of virtual package may be the identifier of the target virtual package specified by the user's pick-up operation.

For example, if the user clicks virtual package 3, the receiving terminal may send the pick-up request carrying the identifier of the receiving terminal and the identifier of virtual package 3 to the server.

It should be noted that, when the pick-up status of the virtual package is having been picked up, the pick-up operation for the virtual package triggered by the user may not be responded by the receiving terminal.

Correspondingly, the server cluster receives the pick-up request sent by the receiving terminal upon the pick-up message.

In block 919, the server cluster detects whether the receiving terminal is qualified to pick up the virtual package according to the pick-up request.

The server cluster extracts the identifier of the virtual package and the identifier of the receiving terminal from the pick-up request.

The server cluster detects whether the extracted identifier of the receiving terminal belongs to the identifiers of the receiving terminals saved in block 913. For example, if the user of the sending terminal sends n virtual packages to a group, the server cluster need to detect whether the identifier of the receiving terminal belongs to the group.

The server cluster further detects whether the pick-up status of the target virtual package is having been picked up or to be picked up, and whether the target virtual package is in a valid time duration.

If the extracted identifier of the receiving terminal belongs to the saved identifiers of the receiving terminals, the pick-up status of the target virtual package is to be picked up, and the target virtual package is in a valid time duration, the server cluster may determine that the receiving terminal is qualified.

It should be noted that, the content to be detected in block 919 is not limited by the example. More or less detecting conditions may be employed in specific examples.

In block 920, when the receiving terminal is qualified to pick up the virtual package, the server cluster detects whether the number of the virtual packages that the receiving terminal has picked up exceeds an upper limit.

The receiving terminal may pick up some of the n virtual packages, to avoid a same receiving terminal picking up all the n virtual packages, the server may also need to detect whether the number of the virtual packages that the receiving terminal has picked up exceeds an upper limit.

In block 921, when the number of the virtual packages that the receiving terminal has picked up does not exceed the upper limit, the server cluster sends the target virtual package to the receiving terminal.

That is, the server cluster transfers the resource corresponding to the target virtual package from the intermediate account to the account of the receiving terminal, and then the server cluster updates the pick-up status of the virtual package as having been picked up, and informs the receiving terminal.

In block 922, the receiving terminal receives the target virtual package sent by the server cluster.

In summary, a method for dispensing resources according to some embodiments of the present disclosure is provided. In this method the pick-up message of the n virtual packages is provided to the receiving terminal. And the pick-up message specifies that the receiving terminal displays at least two virtual packages of the n virtual packages simultaneously in a user interface. This operation allows the user to selectively pick up one of the virtual packages, rather than frequently click on the same virtual package. And the process of the user's selection may also reduce the number of the pick-up requests triggered by the user in a unit of time, then reduce the number and the frequency of invalid pick-up operations effectively, and thus reduce instantaneous loading stress of the server due to a large number of pick-up requests triggered in a short time.

In this method, the receiving terminal may update the display status of each virtual package according to the pick-up status of each virtual package. Thereby when picking up virtual package in a user interface, a user needs to select and judge, then a pick-up operation is triggered. This may further reduce the possibility of frequently clicking on the same virtual package of users, and thus reduce the number and the frequency of invalid pick-up operations effectively.

It should be noted that, in the above examples, the sending terminal may also generates only one virtual package in the process of dispensing resources, the receiving terminal may show one virtual package in the user interface, and change the display status of the virtual package in real time according to the pick-up status of the virtual package. When the pick-up status of the virtual package is having been picked up, the user of the receiving terminal may not pick up the virtual package. Therefore, the number and the frequency of invalid pick-up operations may also be reduced effectively.

Figure 10:
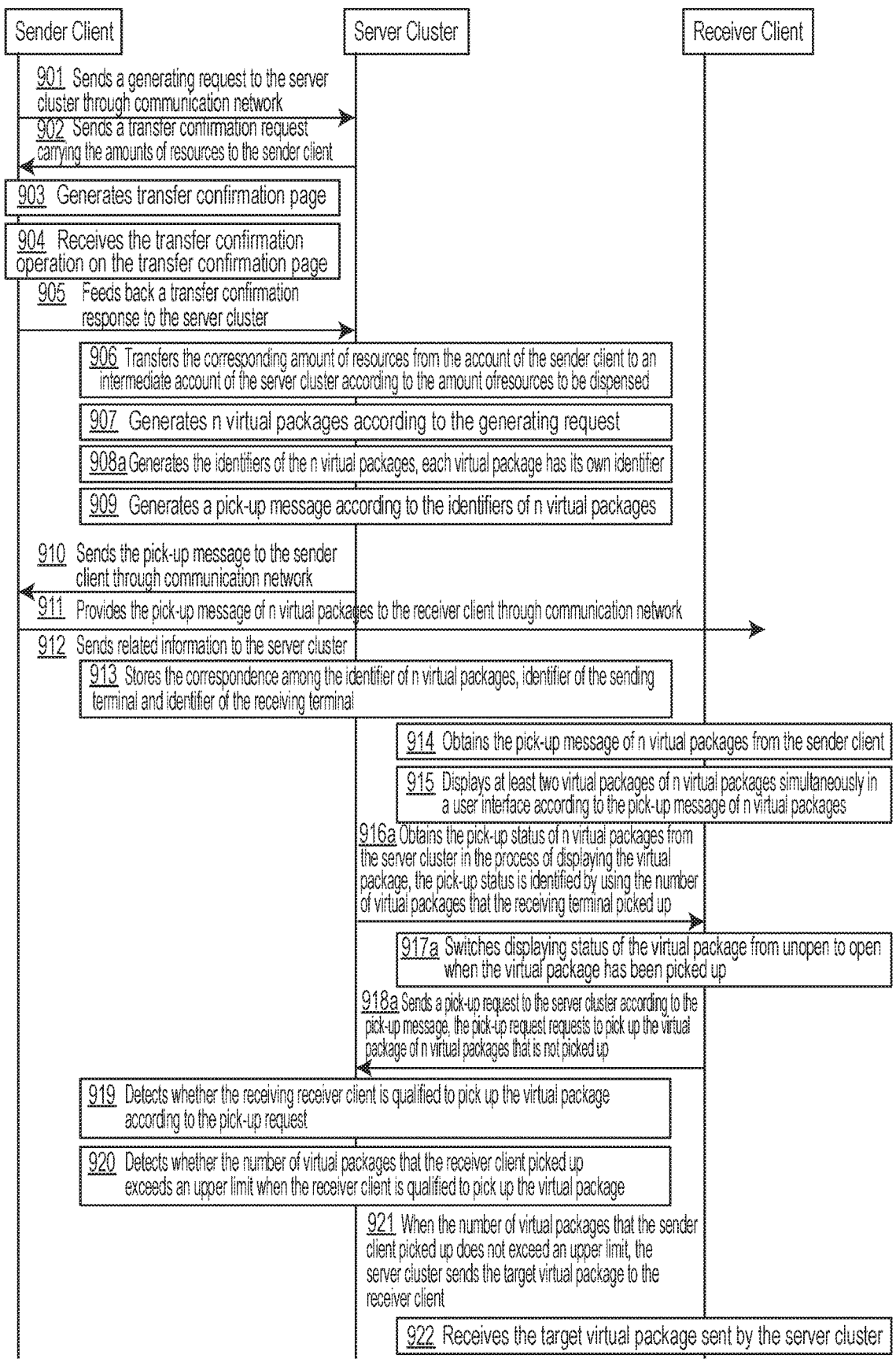
FIG. 10 is a flowchart illustrating a method for dispensing resources according to some embodiments of the present disclosure.

It should be noted that, in the above examples illustrated, n virtual packages have their own identifiers. In another possible example, the n virtual packages share the same identifier. In this case, block 908 may be replaced by block 908*a*, block 916 may be replaced by block 916*a*, block 917 may be replaced by block 917*a*, and block 918 may be replaced by block 918*a*, as shown in FIG. 10.

In block 908*a*, the server cluster generates the identifier corresponding to the n virtual packages, wherein, the n virtual packages have the same identifier.

For the n virtual packages needed to be generated according to the same generating request, the dispensing server generates one identifier. The identifier is stored corresponding to the parameters of the virtual packages. The identifier of the virtual packages is to identify the n virtual packages generated according to the generating request uniquely. The identifier of the virtual packages is a serial number usually consisting of numbers.

The relationship of the identifier of the virtual package and the parameters of virtual packages is stored by the server cluster. For example, the corresponding relationships may be shown in the following table-1:

TABLE 1

| identifier of the virtual package | parameters of virtual package |
|---|---|
| 20150128000001 | s = 200, n = 5, the assignment type is assigning in average |
| 20150128000002 | s = 100, n = 3, the assignment type is assigning randomly |
| 20150128000003 | s = 88, n = 20, the assignment type is assigning randomly |
| 20150128000004 | s = 200, n = 8, the assignment type is assigning randomly |
| . . . | . . . |

In block 916a, the receiving terminal obtains the pick-up status of the n virtual packages from the server cluster in the process of displaying the virtual packages. The pick-up status may be identified by the number of virtual packages that has been picked up by the receiving terminal.

When the n virtual packages share the same identifier, the pick-up status of the n virtual packages is identified by the number of virtual packages that has been picked up by the receiving terminal. The receiver client obtains the pick-up status of the n virtual packages from the server cluster.

In block 917a, the receiving terminal switches a displaying status of the virtual package that has been picked up from unopened to open according to the pick-up status of the n virtual packages.

When a virtual package of the n virtual packages has been picked up, the receiving terminal may switch the displaying status of the virtual packages from unopened to open.

The virtual package that has been picked up may be designated by the server, or designated by the receiving terminal or selected randomly by the receiving terminal.

For example, when 3 of 8 virtual packages have been picked up, the receiving terminal switches the displaying status of 3 virtual packages from unopened to open randomly.

In block 918a, the receiving terminal sends a pick-up request to the server according to the pick-up message, the pick-up request requests to pick up a virtual package from the virtual packages that have not been picked up of the n virtual packages.

The receiving terminal extracts the identifier shared by the n virtual packages from the pick-up message, and sends the pick-up request carrying the identifier of the receiving terminal and the same identifier to the server cluster, so as to pick up the virtual package from the virtual packages that has not been picked up.

But from the user's perspective, the user is to pick up the virtual package designated by the user's operation. That is, the user may still see n different virtual packages, but the same identifier is used among the sending terminal, the receiving terminal and the server cluster to identify the n virtual packages.

Figure 11:
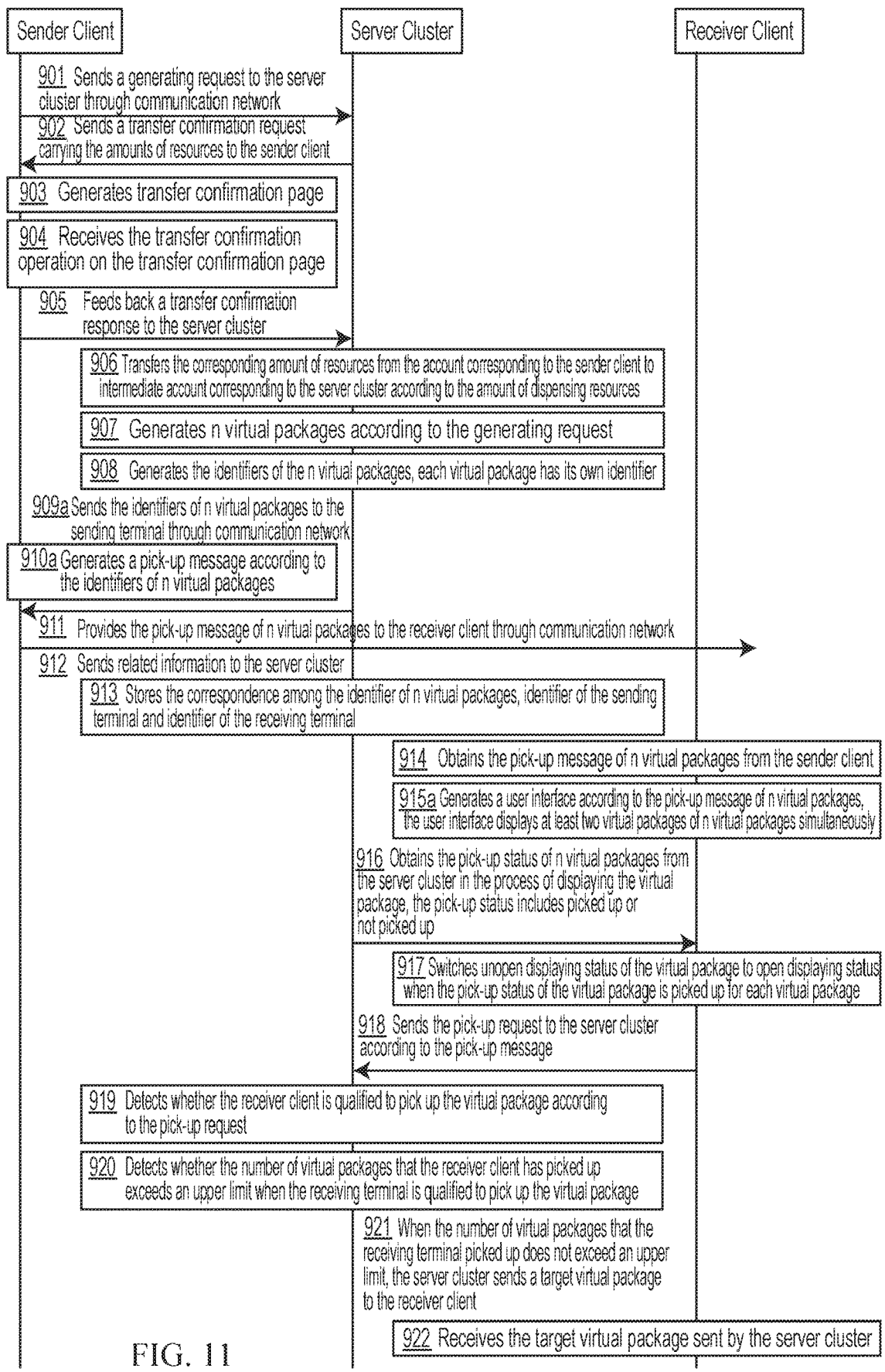
FIG. 11 is a flowchart illustrating a method for dispensing resources according to some embodiments of the present disclosure.

It should also be noted that, the above pick-up message may also be generated by the sending terminal. The user interface may also self-generate according to the pick-up message. No particularly limitations would be made on this aspect by the examples of the present disclosure. In this case, block 909 may be replaced by block 909a, block 910 may be replaced by block 910a, and block 915 may be replaced by block 915a, as shown in FIG. 11.

In block 909a, the server cluster sends the identifiers of the n virtual packages to the sending terminal through the communication network.

In block 910a, the sending terminal generates a pick-up message according to the identifiers of the n virtual packages.

The sending terminal generates a pick-up message according to the identifiers of the n virtual packages and the number of virtual packages n.

The pick-up message may be a webpage link, and there is at least one webpage content corresponding to the webpage link. And in each webpage content, at least two virtual packages of the n virtual packages are displayed simultaneously.

The pick-up message may also be a string carrying the identifiers of the n virtual packages and the number of virtual packages n.

In block 915a, the receiving terminal generates a user interface according to the pick-up message of the n virtual packages. The user interface displays at least two virtual packages of the n virtual packages simultaneously;

That is, when the pick-up message is a webpage link, the webpage content corresponding to the webpage link may be generated by the server cluster or the sending terminal.

When the pick-up message is a string, the receiving terminal generates a user interface according to the identifiers of the n virtual packages and the number of virtual packages n. The user interface may display at least two virtual packages of the n virtual packages simultaneously.

That is, the user interface used for picking up virtual packages may be generated by any of the sending terminal, the server cluster or the receiving terminal.

Figure 12:
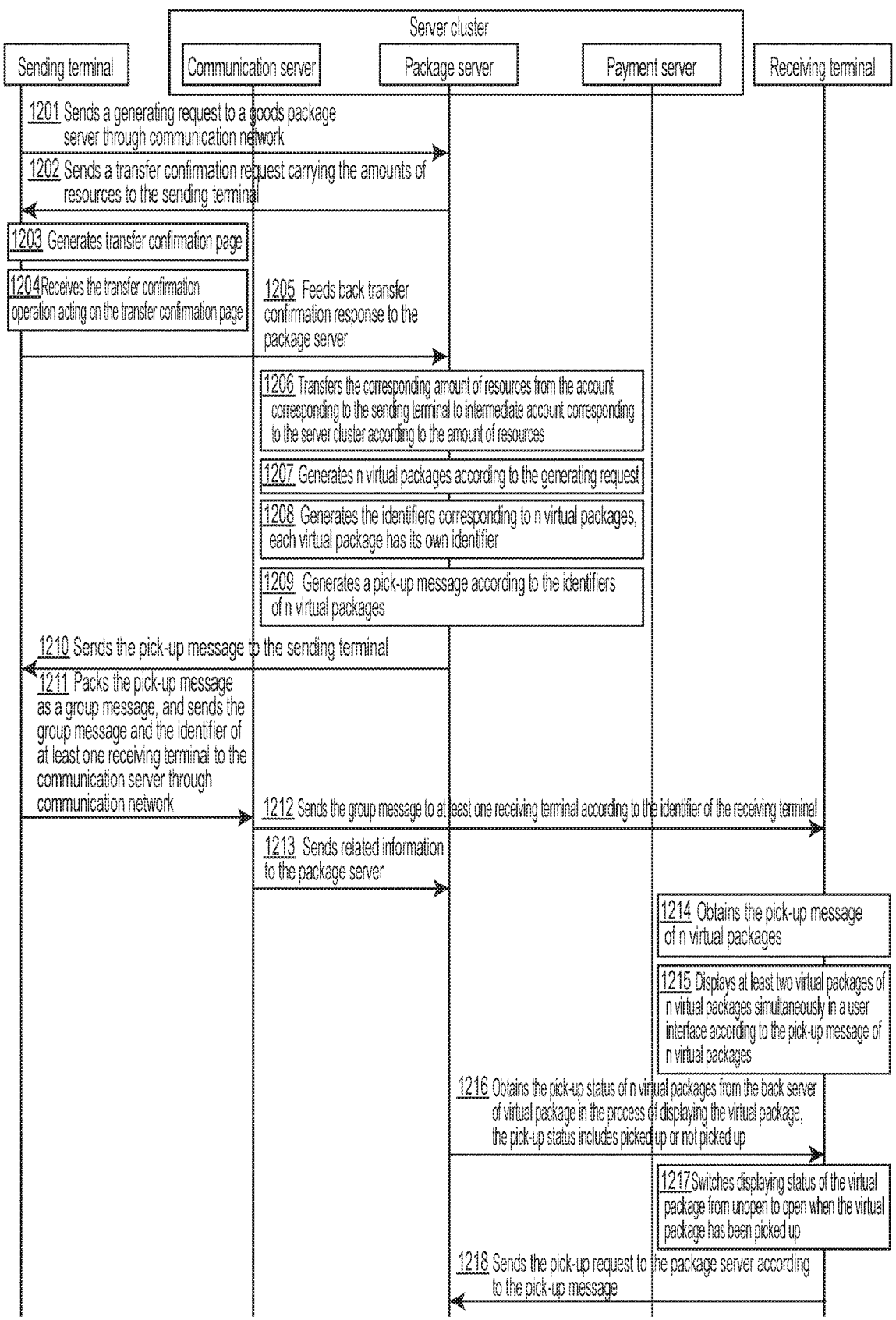
FIG. 12 is a flowchart illustrating a method for dispensing resources according to some embodiments of the present disclosure.

Referring to FIG. 12, FIG. 12 is a flowchart illustrating a method for dispensing resources according to another example of the present disclosure. The example illustrates the method for dispensing resources being applied to the systems for dispensing resources as shown in FIG. 1 and FIG. 2. The method includes the following steps.

(1) The processes of generating virtual packages, includes the following blocks 1201 to 1210.

In block 1201, a sending terminal sends a generating request to a package server through a communication network.

The generating request may carry the amount of resources to be dispensed and the number of virtual packages to be dispensed n. In some examples, the generating request may also carry an upper limit of the number of the virtual packages that each receiving terminal may pick up. In some examples, the generating request may also carry assignment type of the resources distributed in virtual packages.

Correspondingly, the package server receives the generating request.

In block 1202, the package server sends a transfer confirmation request carrying the amount of resources to be dispensed to the sending terminal.

Correspondingly, the sending terminal receives the transfer confirmation request.

In block 1203, the sending terminal generates a transfer confirmation page.

In block 1204, the sending terminal receives the transfer confirmation operation performed on the transfer confirmation page.

In block 1205, the sending terminal feeds back a transfer confirmation response to the package server.

In block 1206, the package server transfers the corresponding amount of resources from the account corresponding to the sending terminal to an intermediate account corresponding to the package server according to the amount of resources to be dispensed.

In block 1207, the package server generates n virtual packages according to the generating request.

After finishing the transfer operation, the package server generates n virtual packages according to the parameters of the n virtual packages. Wherein, each virtual package is to distribute a part of resources to be dispensed to the receiving terminal. Wherein, n is an integer greater than one.

In block 1208, the package server generates the identifiers corresponding to the n virtual packages.

In block 1209, the package server generates a pick-up message according to the identifiers of the n virtual packages.

In block 1210, the package server sends the pick-up message to the sending terminal.

Correspondingly, the sending terminal receives the pick-up message sent by the package server.

(2) The process of dispensing the virtual packages includes the following block s1211 to 1217.

In block 1211, the sending terminal packs the pick-up message as a group message, and sends the group message and the identifier of at least one receiving terminal to the communication server through the communication network.

In block 1212, the communication server sends the group message to at least one receiving terminal according to the identifier of the receiving terminal.

Correspondingly, the receiving terminal receives the group message sent by the communication server. The group message carries the pick-up message of the n virtual packages.

In block 1213, the communication server sends related information to the package server.

The related information may include the identifiers of the n virtual packages, the identifier of the sending terminal and the identifier of each receiving terminal.

Correspondingly, the package server receives and stores the related information.

In block 1214, the receiving terminal obtains the pick-up message of the n virtual packages.

In block 1215, the receiving terminal displays at least two virtual packages of the n virtual packages simultaneously in a user interface according to the pick-up message of the n virtual packages.

In block 1216, the receiving terminal obtains the pick-up status of the n virtual packages from the package server in the process of displaying the virtual package, the pick-up status includes a status of having been picked up and a status of to be picked up.

In block 1217, for each virtual package that has been picked up, the receiving terminal switches the displaying status of the virtual package from unopened to open.

(3) The process of picking up virtual package includes the following blocks 1218 to 1221.

In block 1218, the receiving terminal sends a pick-up request to the package server according to the pick-up message.

Correspondingly, the package server receives the pick-up request sent by the receiving terminal according to the pick-up message.

In block 1219, the package server detects whether the receiving terminal is qualified to pick up the virtual package according to the pick-up request.

In block 1220, when the receiving terminal is qualified to pick up the virtual package, the package server detects whether the number of virtual packages that the receiving terminal has picked up exceeds an upper limit.

In block 1221, when the number of virtual packages that the receiving terminal has picked up does not exceed an upper limit, the package server sends a target virtual package to the receiving terminal.

That is, the package server transfer the resource corresponding to the target virtual package from the intermediate account to the account of the receiving terminal, and then the package server updates the pick-up status of the target virtual package as having been picked up, and inform each receiving terminal through a message.

Correspondingly, the receiving terminal receives the target virtual package sent by the package server.

The account corresponding to the sending terminal, the intermediate account and the account corresponding to the receiving terminal are all the registered account of the communication service side. The resource is usually stored in a third party payment system. When a user wants to use the resource, he/she needs to extract the resource to his/her bank card in the third party payment system.

(4) The process of withdrawing cash includes the following blocks 1222 to 1229.

In block 1222, the receiving terminal sends a withdraw request to a payment server. The withdraw request carries the amount of cash.

Correspondingly, the payment server receives the withdraw request sent by the receiving terminal.

In block 1223, the payment server judges whether the receiving terminal has finished a register.

In block 1224, when the result of judging shows that the receiving terminal does not finish the register, the payment server sends a registration tip to the receiving terminal. The registration tip may guide the receiving terminal to finish the register.

In block 1225, when the result of judging shows that the receiving terminal has finished the register, the payment server obtains the bank card information corresponding to the receiving terminal.

In block 1226, the payment server sends a verification request to the receiving terminal. The verification request verifies the identity of the receiving terminal.

Correspondingly, the receiving terminal receives the verification request sent by the payment server.

In block 1227, when receiving the verification information that the user of the receiving terminal inputs, the receiving terminal sends a verification response carrying the verification information to the payment server.

Correspondingly, the payment server receives the verification response carrying the verification information.

In block 1228, the payment server detects whether the verification information is correct.

In block 1229, the payment server transfers the amount of cash carried by the withdraw request to the bank card corresponding to the receiving terminal when the result of detecting shows that the verification information is correct.

So far, a complete process of dispensing virtual packages is schematically illustrated.

It should be noted that, the above example illustrates that the server cluster includes a communication server, a package server and a payment server. However, the server cluster may also be divided into other architectures, which is not particularly limited by the examples of the present disclosure.

It should be noted that, in each of the above examples, the steps relating to a sending terminal may be regarded as a method for dispensing resource of the sender client side. The steps relating to a server cluster may be regarded as a method for dispensing resource of the server cluster side. And the steps relating to a receiving terminal may be regarded as a method for dispensing resource of the receiving terminal side.

Some devices according to some examples of the present disclosure will be described in the followings descriptions. And details of the devices which are not described below may be referred to the above corresponding methods.

Figure 13:
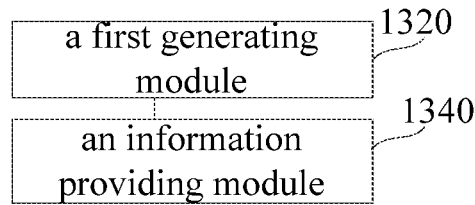
FIG. 13 is a block diagram illustrating a sender client according to some embodiments of the present disclosure.

Referring to FIG. 13, FIG. 13 is a block diagram illustrating a sending terminal according to some embodiments of the present disclosure. The sending terminal includes a resources dispensing device. The resources dispensing device may constitute a part of or the whole of the sending terminal by software, hardware or the combination of both. The resources dispensing device may include the following module.

A first generating module 1320 is to generate n virtual packages through interacting with a server cluster, wherein each virtual package is to distribute a part of resources to be dispensed to a receiving terminal. And n is an integer larger than 1.

An information providing module 1340 is to provide a pick-up message of the n virtual packages to the receiving terminal, wherein the pick-up message specifies that the receiving terminal displays at least two virtual packages of the n virtual packages simultaneously in a user interface.

In summary, the sending terminal according to some embodiments of the present disclosure is provided. According to the functions of the sending terminal, a pick-up message of the n virtual packages is provided to the receiving terminal, and the pick-up message specifies that the receiving terminal may display at least two virtual packages of the n virtual packages simultaneously in a user interface. This operation allows a user to selectively pick up one of the virtual packages, rather than frequently click on the same virtual package. The process of user's selection may reduce the number of the pick-up requests triggered by the user in a unit of time, then reduce the number and the frequency of invalid pick-up operation effectively, and thus reduce instantaneous loading stress of a server due to a large number of pick-up requests triggered in a short time.

Figure 14:
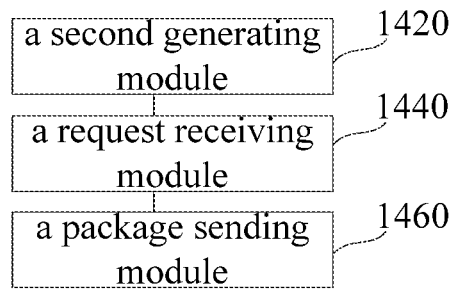
FIG. 14 is a block diagram illustrating a server cluster according to some embodiments of the present disclosure.

Referring to FIG. 14, FIG. 14 is a block diagram illustrating a server cluster according to some embodiments of the present disclosure. The server cluster includes a resources dispensing device. The resources dispensing device may constitute a part of or the whole of the sending terminal by software, hardware or the combination of both. The resources dispensing device may include the following module.

A second generating module 1420 is to generate n virtual packages through interacting with a sending terminal, wherein each virtual package is to distribute a part of resources to be dispensed to a receiving terminal. And n is an integer larger than 1.

A request receiving module 1440 is to receive a pick-up request sent by the receiving terminal, wherein the pick-up request is sent by the receiving terminal to the server cluster according to a pick-up operation received when the receiving terminal displays at least two virtual packages of the n virtual packages simultaneously in a user interface according to a pick-up message of the n virtual packages.

A package sending module 1460 is to send a target virtual package to the receiving terminal according to the pick-up request.

In summary, the server cluster according to some embodiments of the present disclosure is provided. According to the function of the server cluster, the server cluster may receive a pick-up request after the receiving terminal displays at least two virtual packages of the n virtual packages simultaneously in a user interface according to a received pick-up operation and sends the pick-up request. The pick-up operation is that a user selectively picks up one of the virtual packages, rather than frequently click on the same virtual package. The process of user's selection may reduce the number of pick-up requests triggered by the user in a unit of time, then reduce the number and the frequency of invalid pick-up operation effectively, and thus reduce instantaneous loading stress of a server due to a large number of pick-up requests triggered in a short time.

Figure 15:
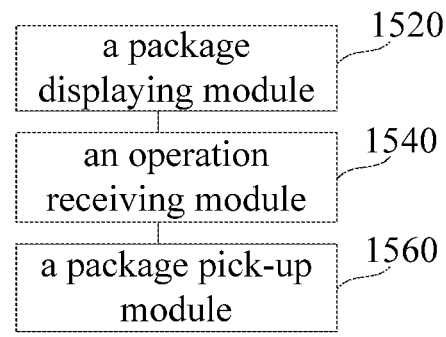
FIG. 15 is a block diagram illustrating a receiver client according to some embodiments of the present disclosure.

Referring to FIG. 15, FIG. 15 is a block diagram illustrating a receiving terminal according to some embodiments of the present disclosure. The receiving terminal may include a resources dispensing device. The resources dispensing device may constitute a part of or the whole of the sending terminal by software, hardware or the combination of both. The resources dispensing device may include the following modules.

A package displaying module 1520 is to display at least two virtual packages of n virtual packages simultaneously in a user interface, wherein n is an integer larger than 1.

An operation receiving module 1540 is to receive a pick-up operation from a user through a user interface.

A package pick-up module 1560 is to pick up a target virtual package from the at least two virtual packages according to the pick-up operation.

In summary, the receiving terminal according to some embodiments of the present disclosure is provided. According to the functions of the receiving terminal, the receiving terminal may display at least two virtual packages of n virtual packages simultaneously in a user interface. This operation allows the user to selectively pick up one of the virtual packages, rather than frequently click on the same virtual package. And the process of user's selection may reduce the number of the pick-up requests triggered by the user in a unit of time, then reduce the number and the frequency of invalid pick-up operation effectively, and thus reduce instantaneous loading stress of a server due to a large number of pick-up requests triggered in a short time.

Figure 16:
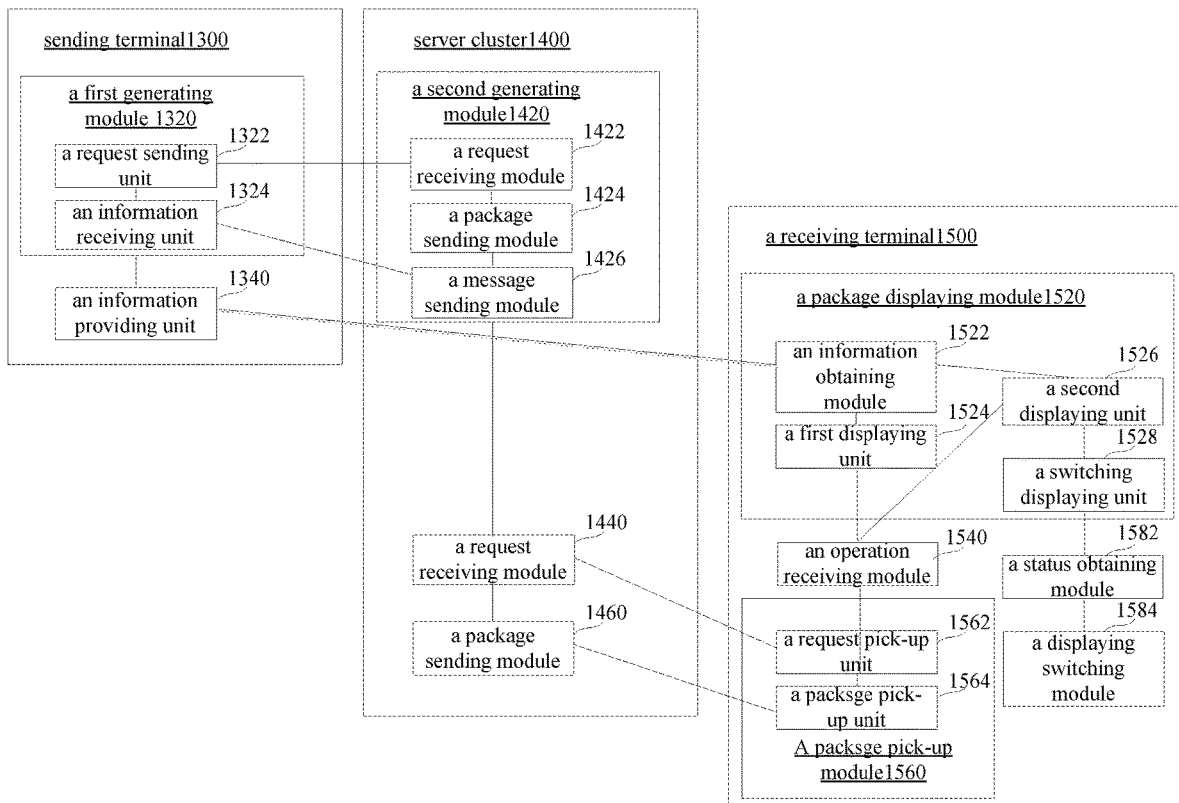
FIG. 16 is a block diagram illustrating a system for dispensing resources according to some embodiments of the present disclosure.

Referring to FIG. 16, FIG. 16 is a block diagram illustrating a system for dispensing resources according to another example of the present disclosure. The system for dispensing resources may include a sending terminal 1300, a server cluster 1400 and a receiving terminal 1500.

In some examples, the sending terminal 1300 may include the following modules.

A first generating module 1320 is to generate n virtual packages through interacting with a server cluster, wherein each virtual package is to distribute a part of resources to be dispensed to a receiving terminal. And n is an integer larger than 1.

An information providing module 1340 is to provide a pick-up message of the n virtual packages to the receiving terminal, wherein the pick-up message specifies that the receiving terminal displays at least two virtual packages of the n virtual packages simultaneously in a user interface.

In some examples, the first generating module 1320 may include the following units.

A request sending unit 1322 is to send a generating request to the server cluster, wherein the generating request at least carries the amount of resources to be dispensed, the number of virtual packages to be dispensed n. And the generating request may also carry an upper limit of the number of the virtual packages that each receiving terminal may pick up.

An information receiving unit 1324 is to receive identifiers of the n virtual packages fed back by the server cluster, generate the pick-up message according to the identifiers of the n virtual packages; or receive the pick-up message fed back by the server cluster, wherein the pick-up message carries identifiers of the n virtual packages.

In some examples, the pick-up message may be a webpage link, and there is at least one webpage content corresponding to the webpage link. And in each webpage content at least two virtual packages of the n virtual packages are displayed simultaneously.

In some examples, the information providing unit 1340 is to:

send the pick-up message of the n virtual packages to at least one receiving terminal in instant messages; or, send the pick-up message of the n virtual packages to at least one receiving terminal in a group message; or, display the pick-up message of the n virtual packages on a social information sharing platform of the sending terminal, wherein the information of the social information sharing platform of the sending terminal is presented to the receiving terminal in a friendship with the sending terminal and being qualified to access the information of the social information sharing platform of the sending terminal; or, display the pick-up message of the n virtual packages on a tweet information sharing platform of the sending terminal, wherein the information of the tweet information sharing platform of the sending terminal is represented to the receiving terminal being qualified to access the information of the tweet information sharing platform of the sending terminal; or display the pick-up message of the n virtual packages on the sending terminal in a two-dimensional code, wherein the two-dimensional code is scanned and the pick-up message is obtained by the at least one receiving terminal.

In some examples, the server cluster 1400 may include the following modules, A second generating module 1420 is to generate n virtual packages through interacting with a sending terminal, wherein each virtual package is to distribute a part of resources to be dispensed to a receiving terminal. And n is an integer larger than 1.

A request receiving module 1440 is to receive a pick-up request sent by the receiving terminal, wherein the pick-up request is sent by the receiving terminal to the server cluster according to a pick-up operation received when the receiving terminal displays at least two virtual packages of the n virtual packages simultaneously in a user interface according to a pick-up message of the n virtual packages.

A package sending module 1460 is to send a target virtual package to the receiving terminal according to the pick-up request.

In some examples, the second generating module 1420 may include the following units.

A request receiving unit 1422 is to receive a generating request sent by the sending terminal, wherein the generating request at least carries the amount of resources to be dispensed and the number of virtual packages to be dispensed n. In some examples, the generating request may further carry the assignment type of the virtual packages, such as assigning in average or randomly. In some examples, the generating request may further carry an upper limit of the number of the virtual packages that each receiving terminal may pick up.

A package generating unit 1424 is to generate the n virtual packages according to the generating request, and distribute identifiers to the n virtual packages.

A message sending unit 1426 is to send the identifiers of the n virtual packages to the sending terminal, so that the sending terminal may generate the pick-up message according to the identifiers of the n virtual packages; or send the pick-up message to the sending terminal, wherein the pick-up message carries the identifiers of the n virtual packages.

In some examples, the pick-up message may be a webpage link. And there is at least one webpage content corresponding to the webpage link. And in each webpage content at least two virtual packages of the n virtual packages are displayed simultaneously.

In some examples, the package sending module 1460 is to:

detect whether the receiving terminal is qualified to pick up the virtual package according to the pick-up request;

detect whether the number of virtual packages of the receiving terminal picked up exceeds an upper limit when the receiving terminal is qualified to pick up the virtual package, wherein the upper limit is a default value or a value carried by the generating request;

send a target virtual package to the receiving terminal when the number of virtual packages that the receiving terminal picked up does not exceeds the upper limit.

In some examples, the receiving terminal 1500 may include the following modules.

A package displaying module 1520 is to display at least two virtual packages of n virtual packages simultaneously in a user interface, wherein n is an integer larger than 1.

An operation receiving module 1540 is to receive a pick-up operation of a user through a user interface.

A package pick-up module 1560 is to pick up a target virtual package of the at least two virtual packages according to the pick-up operation.

In some examples, the package displaying module 1520 may include an information obtaining unit 1522, at least one of a first displaying unit 1524 and a second displaying unit 1526.

The information obtaining module 1522 is to obtain a pick-up message of n virtual packages from a sending terminal.

The first displaying unit 1524 is to display the entire area or a partial area of a general pick-up interface according to the pick-up message of the n virtual packages, wherein the general pick-up interface displays the n virtual packages simultaneously.

The second displaying unit 1526 is to display a first pick-up interface of m pick-up interfaces according to the pick-up message of the n virtual packages, wherein each pick-up interface displays at least two virtual packages of the n virtual packages. And m is an integer larger than 1.

In some examples, the pick-up message may be a webpage link. And there is at least one webpage content corresponding to the webpage link. And in each webpage content at least two virtual packages of the n virtual packages may be displayed simultaneously.

Alternatively, the package displaying module 1520 may further include the following units.

A switching displaying unit 1528 is to switch the first pick-up interface displayed in the second displaying unit to a second pick-up interface of the m pick-up interfaces according to a switching operation received.

In some examples, the receiving terminal 1500 may further including the following modules.

A status obtaining module 1582 is to obtain pick-up status of the n virtual packages from the server cluster, wherein the pick-up status includes a status of having been picked up and a status of to be picked up.

A displaying switching module 1584 is to switch the displaying status of the virtual package which has been picked up from unopened to open.

In some examples, the package pick-up module 1560 may include:

a request pick-up unit 1562, to send a pick-up request to the server cluster according to the received pick-up operation, wherein the pick-up request is to pick up a target virtual package from the at least two virtual packages; and a package pick-up unit 1564, to receive the target virtual package sent by the server cluster, wherein the target virtual package is sent when the server cluster detects that the receiving terminal is qualified to pick up the virtual package and the number of virtual packages that the receiving terminal has picked up does not exceed an upper limit, the upper limit is a default value or a value carried by the generating request.

It should be noted that in the above description, the term "module" or "unit" may refer to a computing logic of a specific function which can be implemented by hardware, firmware and/or software. The modules and units listed above are only examples. In applications, functions of the above modules and units can be implemented by other modules or by other hardware devices if needed. And each hardware device may implement one or more functional modules. That is, functional modules implementing a part of functions or all the functions may be established in the hardware device.

The serial number of the examples of the present disclosure is only used for illustration. The serial number does not stand for the importance of the examples.

Those skilled in the art would understand, all the steps or some steps of the above examples may be implemented by hardware. Or all the steps or some steps of the above examples may be implemented by hardware executing a software program. The program may be stored in a computer readable medium. The computer readable medium mentioned may refer to ROM, discs or compact discs.

What is described in the foregoing are only partial examples of the present disclosure, but are not all examples. Any modification, equivalent substitution and improvement without departing from the spirit and principle of the present disclosure are within the protection scope of the present disclosure.

The invention claimed is:

1. A method for dispensing virtual resources which are electronic, applied to a server cluster having one or more processors and memory storing program instructions executable by the one or more processors, the method comprising:

receiving, by the server cluster, a generating request requesting for generating virtual packages which are electronic from a sending terminal associated with a sending user in a group of a social application, and obtaining, from the generating request, parameters of the virtual packages, comprising an amount indicating an amount of virtual resources to be dispensed through virtual packages, a number n indicating a number of virtual packages to be dispensed, and an assignment type indicating randomly or averagely distributing the virtual resources to be dispensed to the virtual packages, and an upper limit of a number of virtual packages allowing each receiving terminal to pick up;

transferring, by the server cluster, the amount of virtual resources from an account of the sending user to an intermediate account of the server cluster, after the server cluster confirms with the send terminal;

generating, by the server cluster, n virtual packages which are electronic according to the parameters of virtual packages carried in the generating request, and generating, by the server cluster, identifiers for the n virtual packages, wherein n is an integer larger than 1;

generating, by the server cluster, at least one webpage content, in each of which, at least two virtual packages of the n virtual packages are displayed simultaneously, according to the identifiers of the n virtual packages, and generating, by the server cluster, a pick-up message of the n virtual packages which comprises a webpage link corresponding to the at least one webpage content, as a group message of the social application, and sending, by the server cluster, the pick-up message to receiving terminals associated with receiving users in the group of the social application to represent the at least one webpage content on a user interface in the social application on the receiving terminals;

notifying, by the server cluster, pick-up statuses of the n virtual packages, indicating whether the n virtual packages have been be picked up, through pick-up status identifiers each of which is formed of an identifier of a virtual package and a status value indicating whether the virtual package has been picked up or not, to the receiving terminals;

receiving, by the server cluster, a pick-up request containing an identifier of a target virtual package selected from the n virtual packages and an identifier of a receiving user sent by a receiving terminal among the receiving terminals, determining whether a pick-up status of the target virtual package is with a status of having not been picked up according to a pick-up status identifier corresponding to the target virtual package, whether the identifier of the receiving user belongs to the group of the social application, and whether a number of virtual packages that the receiving terminal has picked up does not exceed the upper limit, and transferring a part of virtual resources assigned to the target virtual package according to the assignment type, from the intermediate account of the server cluster to an account of the receiving user according to the identifier of the target virtual package in the pick-up request, in response to determining that the pick-up status of the target virtual package is with the status of having not been picked up, that the identifier of the receiving user belongs to the group of the social application, and that the number of virtual packages that the receiving terminal has picked up does not exceed the upper limit; and updating, by the server cluster, the pick-up status of the target virtual package from the status of having not been picked up to a status of having been picked up by updating the pick-up status identifier corresponding to the target virtual package, and notifying the status of having-been picked up of the target virtual package to the receiving terminals through the updated pick-up status identifier corresponding to the target virtual package.

2. The method of claim 1, wherein generating the n virtual packages further comprises:

sending the identifiers of the n virtual packages to the sending terminal; or sending the pick-up message to the sending terminal, wherein the pick-up message carries the identifiers of the n virtual packages.

3. The method of claim 2, wherein transferring the part of virtual resources associated with the target virtual package to the account associated with the receiving terminal according to the identifier of the target virtual package in the pick-up request comprises:
  detecting whether the receiving terminal is qualified to pick up a virtual package according to the pick-up request;
  detecting whether the number of virtual packages that the receiving terminal has picked exceeds an upper limit in response to detecting that the receiving terminal is qualified to pick up a virtual package; wherein the upper limit is a default value or a value carried by the generating request; and
  transferring the part of virtual resources assigned to the target virtual package to the account of the receiving user in response to detecting that the number of virtual packages that the receiving terminal has picked does not exceeds the upper limit.

4. A server cluster, comprising:
  one or more processors; and
  a memory storing one or more program instructions, when executed by the one or more processors cause the one or more processors to perform the following:
  receiving a generating request requesting for generating virtual packages which are electronic from a sending terminal associated with a sending user in a group of a social application, and obtaining, from the generating request, parameters of the virtual packages, comprising an amount indicating an amount of virtual resources which are electronic to be dispensed through the virtual packages, a number n indicating a number of the virtual packages to be dispensed, an assignment type indicating randomly or averagely distributing the virtual resources to be dispensed to the virtual packages, and an upper limit of a number of virtual packages allowing each receiving terminal to pick up;
  transferring the amount of virtual resources from an account of the sending user to an intermediate account of the server cluster, after confirming with the send terminal;
  generating n virtual packages which are electronic, according to the parameters of virtual packages carried in the generating request, and generating identifiers for the n virtual packages, wherein, n is an integer larger than 1;
  generating at least one webpage content, in each of which, at least two virtual packages of the n virtual packages are displayed simultaneously, with each virtual package having an identifier of the virtual package, and generating a pick-up message of the n virtual packages which comprises a webpage link corresponding to the at least one webpage content, as a group message of the social application, and sending the pick-up message to receiving terminals associated with receiving users in the group of the social application to represent the at least one webpage content on a user interface in the social application on the receiving terminals;
  notifying pick-up statuses of the n virtual packages, indicating whether the n virtual packages have been be picked up, through pick-up status identifiers each of which is formed of an identifier of a virtual package and a status value indicating whether the virtual package has been picked up or not, to the receiving terminals;
  receiving a pick-up request containing an identifier of a target virtual package selected from the n virtual packages and an identifier of a receiving user sent by a receiving terminal among the receiving terminals, determining whether a pick-up status of the target virtual package is with a status of having not been picked up according to a pick-up status identifier corresponding to the target virtual package, whether the identifier of the receiving user belongs to the group of the social application, and whether a number of virtual packages that the receiving terminal has picked up does not exceed the upper limit, and transferring a part of virtual resources assigned to the target virtual package according to the assignment type, from the intermediate account of the server cluster to an account of the receiving user according to the identifier of the target virtual package in the pick-up request, in response to determining that the pick-up status of the target virtual package is with the status of having not been picked up, that the identifier of the receiving user belongs to the group of the social application, and that the number of virtual packages that the receiving terminal has picked up does not exceed the upper limit; and
  updating the pick-up status of the target virtual package from the status of having not been picked up to a status of having been picked up by updating the pick-up status identifier corresponding to the target virtual package, and notifying the status of having-been picked up of the target virtual package to the receiving terminals through the updated pick-up status identifier corresponding to the target virtual package.

5. The server cluster of claim 4, wherein the one or more programs instructions is further executable by the one or more processors to perform the following:
  sending the identifiers of the n virtual packages to the sending terminal; or, sending the pick-up message to the sending terminal.

6. The method of claim 1, wherein generating the identifiers for the n virtual packages comprises:
  generating the identifiers for the n virtual packages, in which an identifier containing two parts: a package group number and a package sub-number, the package group number is an identifier field shared by the n virtual packages generated at the same time, and the package sub-number is an identifier field distinguishing each package of the n virtual packages generated at the same time.

* * * * *